(12) United States Patent
Sigelakis

(10) Patent No.: US 8,640,728 B2
(45) Date of Patent: Feb. 4, 2014

(54) FIRE HYDRANT CONTROL VALVE

(75) Inventor: George Sigelakis, East Rockaway, NY (US)

(73) Assignee: Sigelock Systems, L.L.C., East Rockaway, NY (US)

( * ) Notice: Subject to any disclaimer, the term of this patent is extended or adjusted under 35 U.S.C. 154(b) by 472 days.

(21) Appl. No.: 12/787,328

(22) Filed: May 25, 2010

(65) Prior Publication Data

US 2011/0290325 A1 Dec. 1, 2011

(51) Int. Cl.
*E03B 9/02* (2006.01)

(52) U.S. Cl.
USPC ........................................ 137/307; 137/304

(58) Field of Classification Search
USPC ............. 137/272, 302, 304, 305, 307, 625.33
See application file for complete search history.

(56) References Cited

U.S. PATENT DOCUMENTS

| | | | | |
|---|---|---|---|---|
| 978,385 A | * | 12/1910 | Lofton | 137/283 |
| 1,278,487 A | * | 9/1918 | Lofton | 137/283 |
| 1,828,763 A | * | 10/1931 | Carnes | 137/107 |
| 2,882,774 A | | 4/1959 | Guttfeld | |
| 3,185,171 A | | 5/1965 | Mueller et al. | |
| 3,223,110 A | * | 12/1965 | Mueller et al. | 137/298 |
| 3,572,786 A | | 3/1971 | Dunton | |
| 3,626,961 A | | 12/1971 | Quinones | |
| 3,742,162 A | | 6/1973 | Wasemann | |
| 3,980,096 A | * | 9/1976 | Ellis et al. | 137/283 |
| 3,980,097 A | | 9/1976 | Ellis | |
| 4,177,826 A | * | 12/1979 | Luckenbill | 137/307 |
| 4,303,223 A | * | 12/1981 | Whisenhunt et al. | 251/357 |
| 4,570,670 A | | 2/1986 | Johnson | |
| 4,633,896 A | * | 1/1987 | Bainbridge et al. | 137/296 |
| 5,441,074 A | * | 8/1995 | Kjaer | 137/375 |
| 5,690,242 A | | 11/1997 | Campbell, Jr. | |
| 5,988,219 A | * | 11/1999 | Larsen | 137/625.43 |
| 6,561,214 B2 | * | 5/2003 | Heil | 137/307 |
| 6,688,269 B1 | | 2/2004 | Steinmetz | |
| 6,688,326 B1 | | 2/2004 | Sigelakis | |
| 6,886,586 B2 | * | 5/2005 | Fleury, Jr. | 137/329.04 |
| 7,025,394 B1 | | 4/2006 | Hunt | |

OTHER PUBLICATIONS

PCT International Search Report—PCT/US 10/01672 (Sep. 2, 2010) 2 pages.
PCT International Search Report—PCT/US 2011/037470 (Sep. 28, 2011) 3 pages.

* cited by examiner

*Primary Examiner* — Eric Keasel
*Assistant Examiner* — R. K. Arundale
(74) *Attorney, Agent, or Firm* — Martine Penilla Group, LLP

(57) ABSTRACT

A valve control device includes an operating stem, a valve top plate, a valve seat rubber, a valve bottom plate, and a valve seat ring. The valve top plate has a conical base with at least three stabilizer arms extending therefrom. Each of the at least three stabilizer arms has a flat outer surface. The valve bottom plate secures the valve seat rubber between the valve bottom plate and a flat bottom surface of the valve top plate. The valve bottom plate, the valve seat rubber, and the conical base are mounted on the operating stem. The valve seat ring has multiple slots, with each of the slots corresponding to one of the at least three stabilizer arms. A standpipe drain system, a method of draining a standpipe, and a locking fire hydrant with a valve access channel drain also are described.

18 Claims, 20 Drawing Sheets

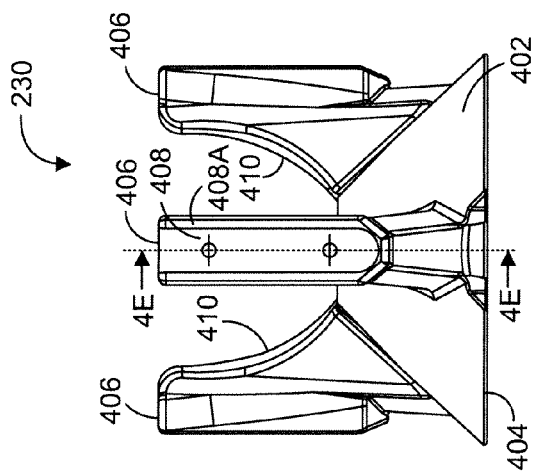
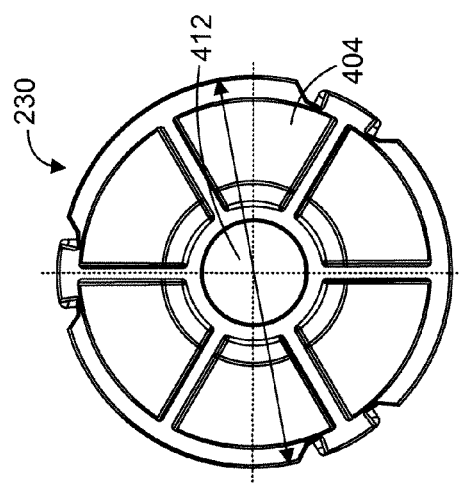
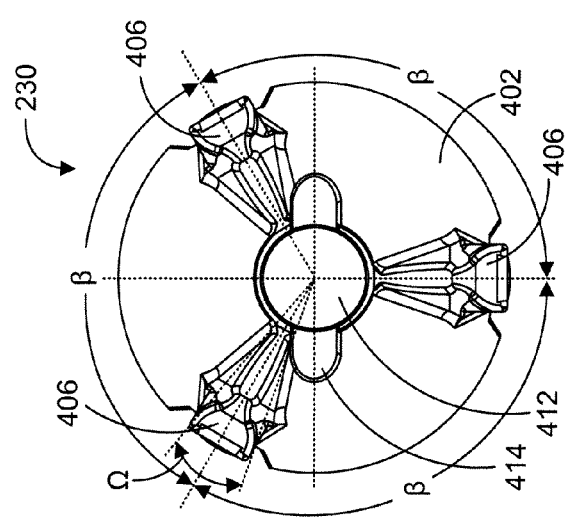
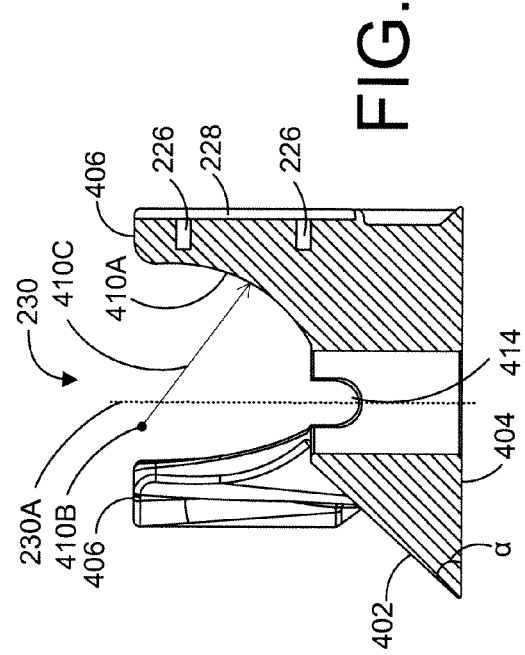
FIG. 4D
FIG. 4E
FIG. 4C
FIG. 4B

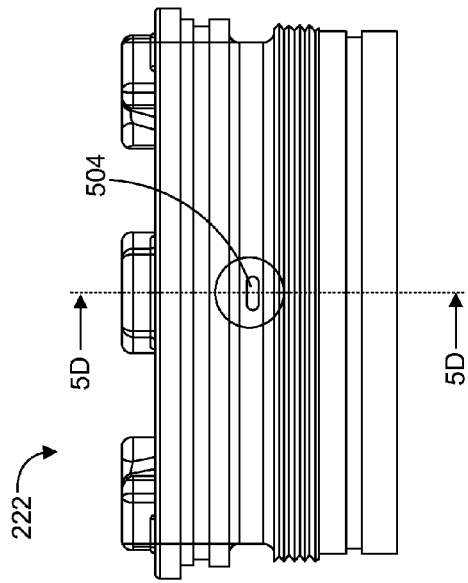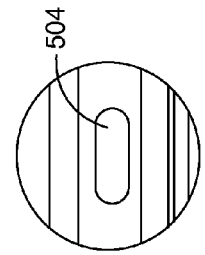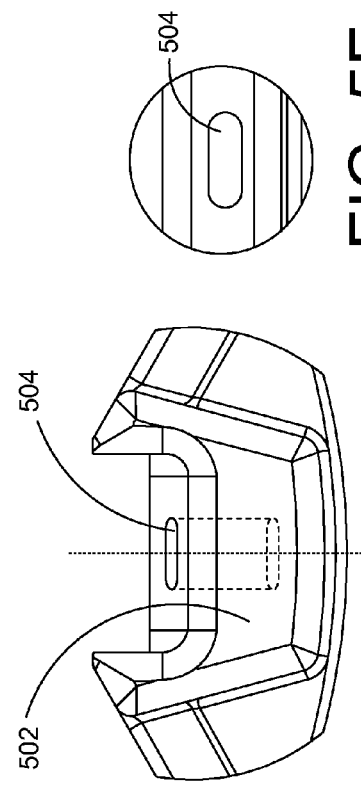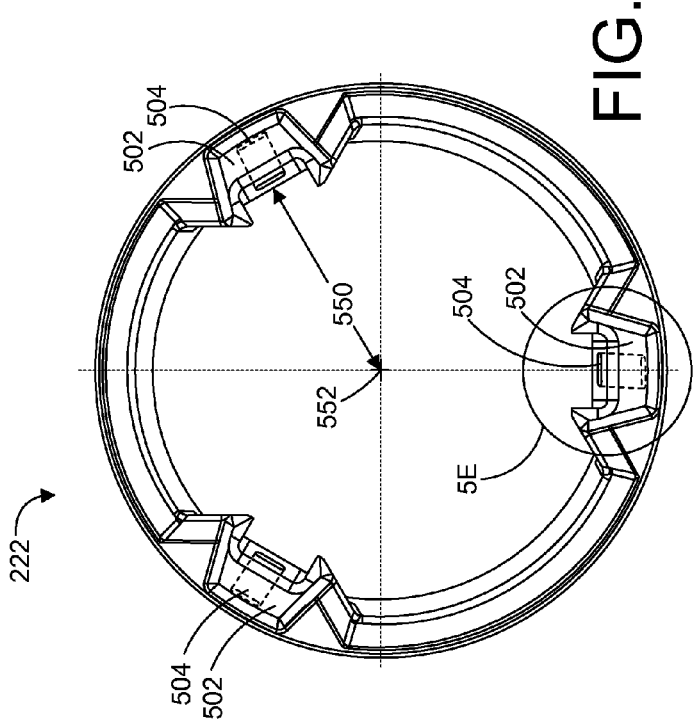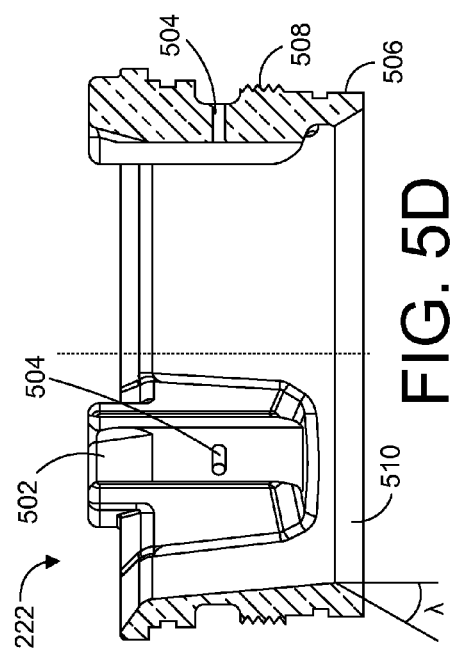

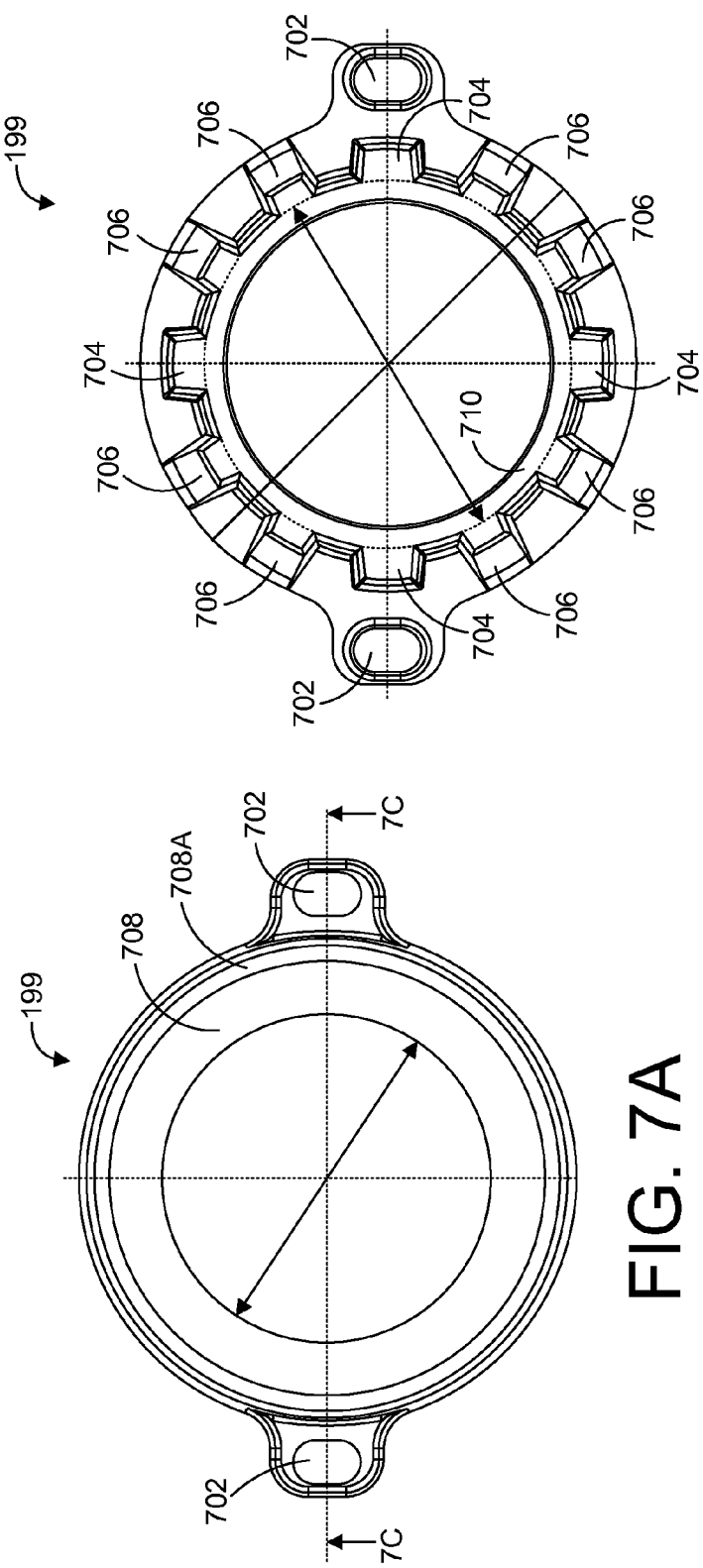
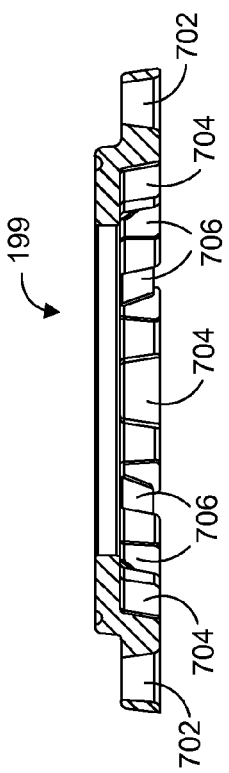
FIG. 7A
FIG. 7B
FIG. 7C

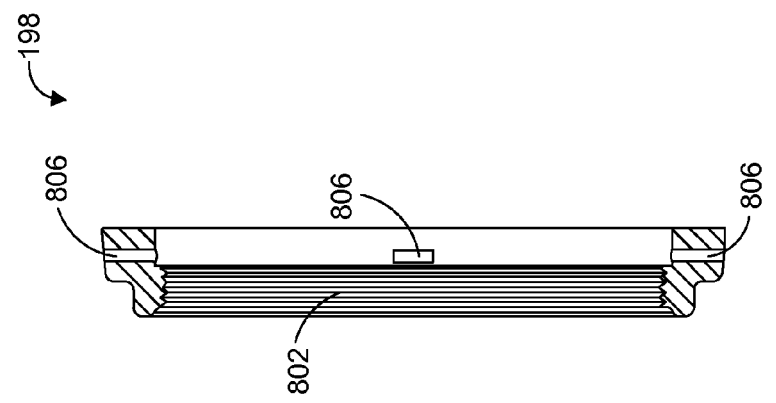
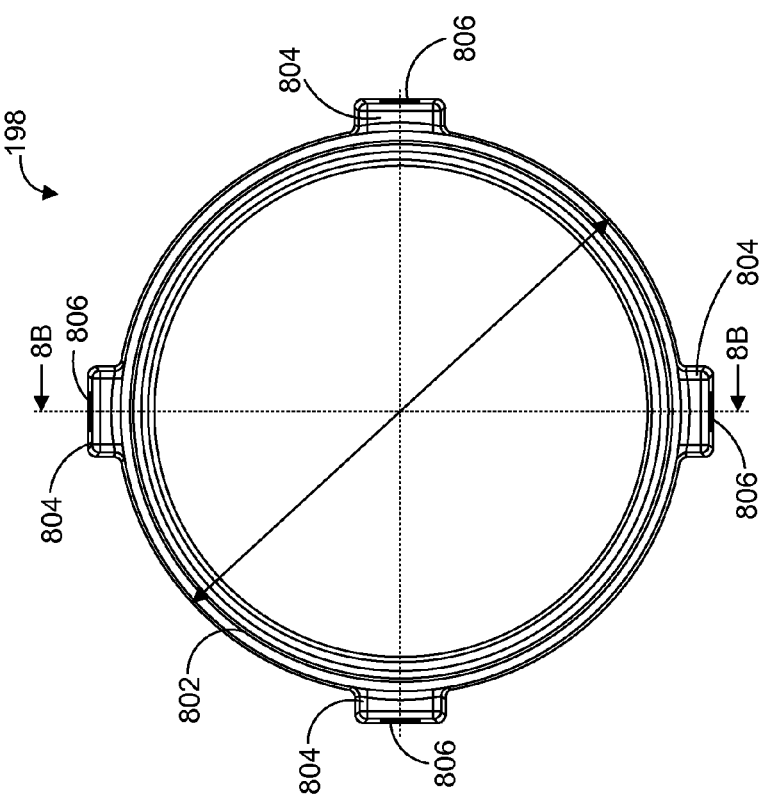
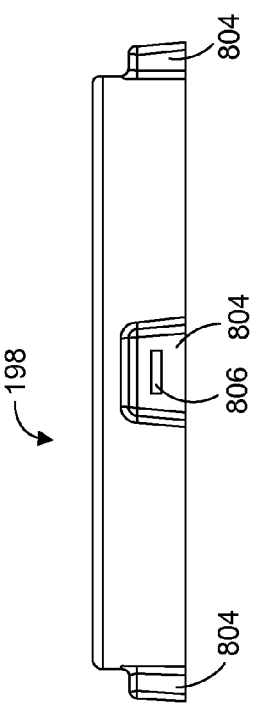

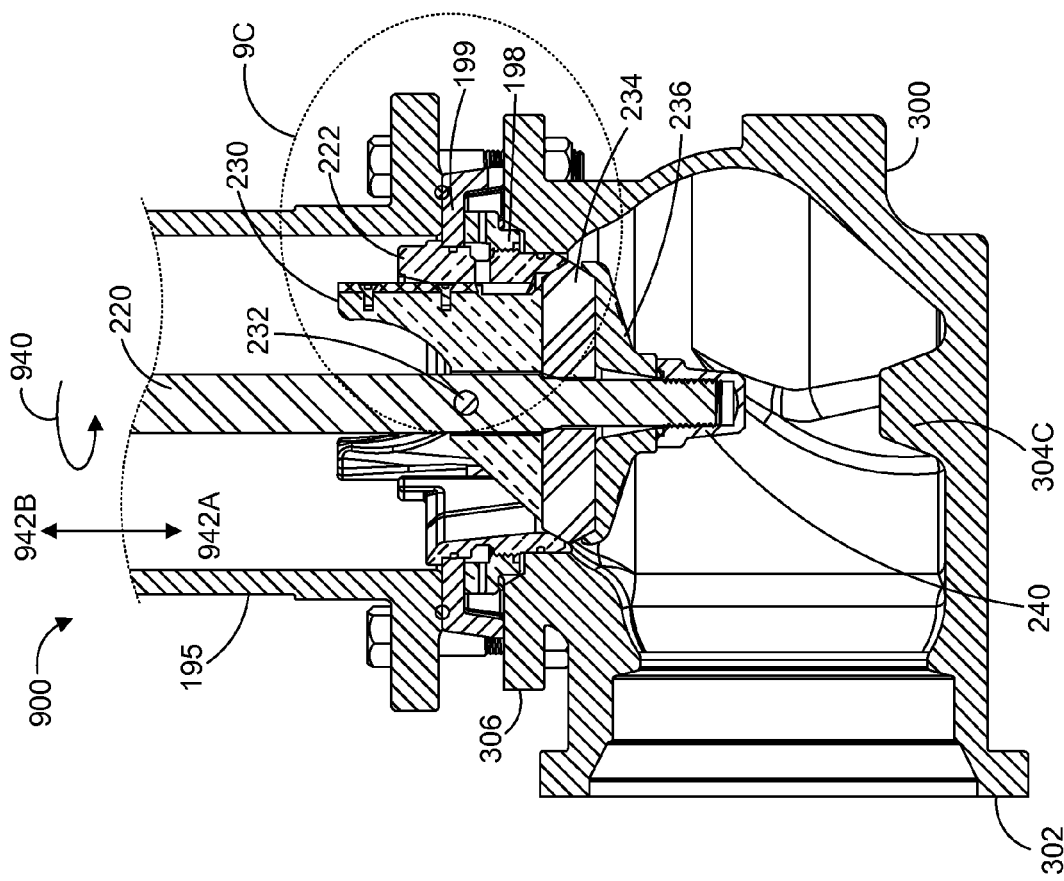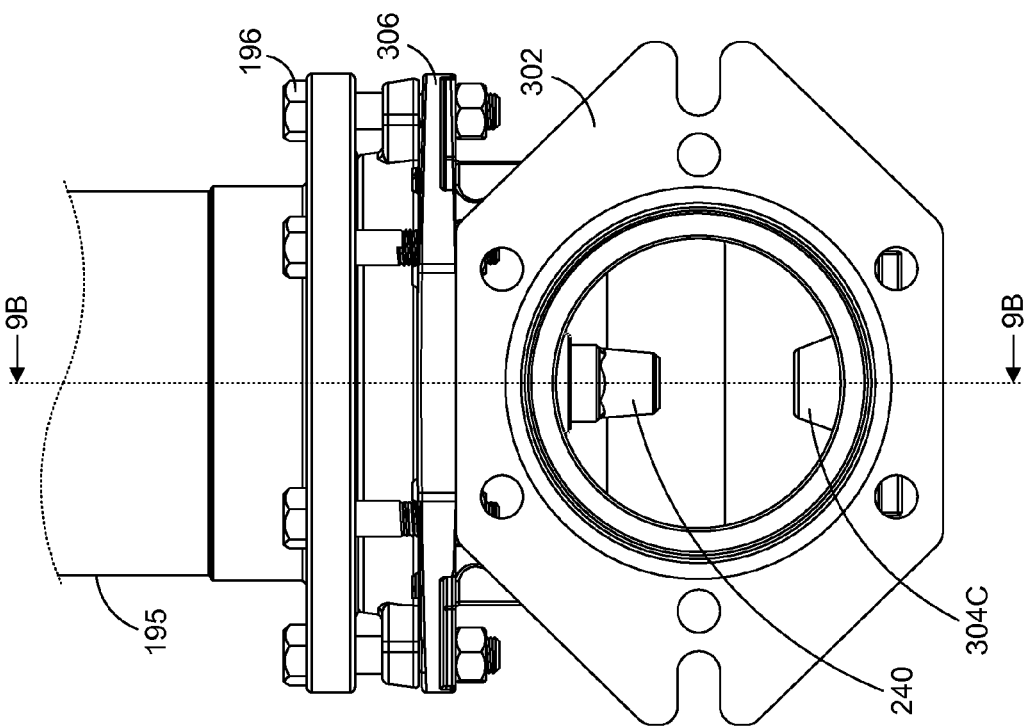
FIG. 9B
FIG. 9A

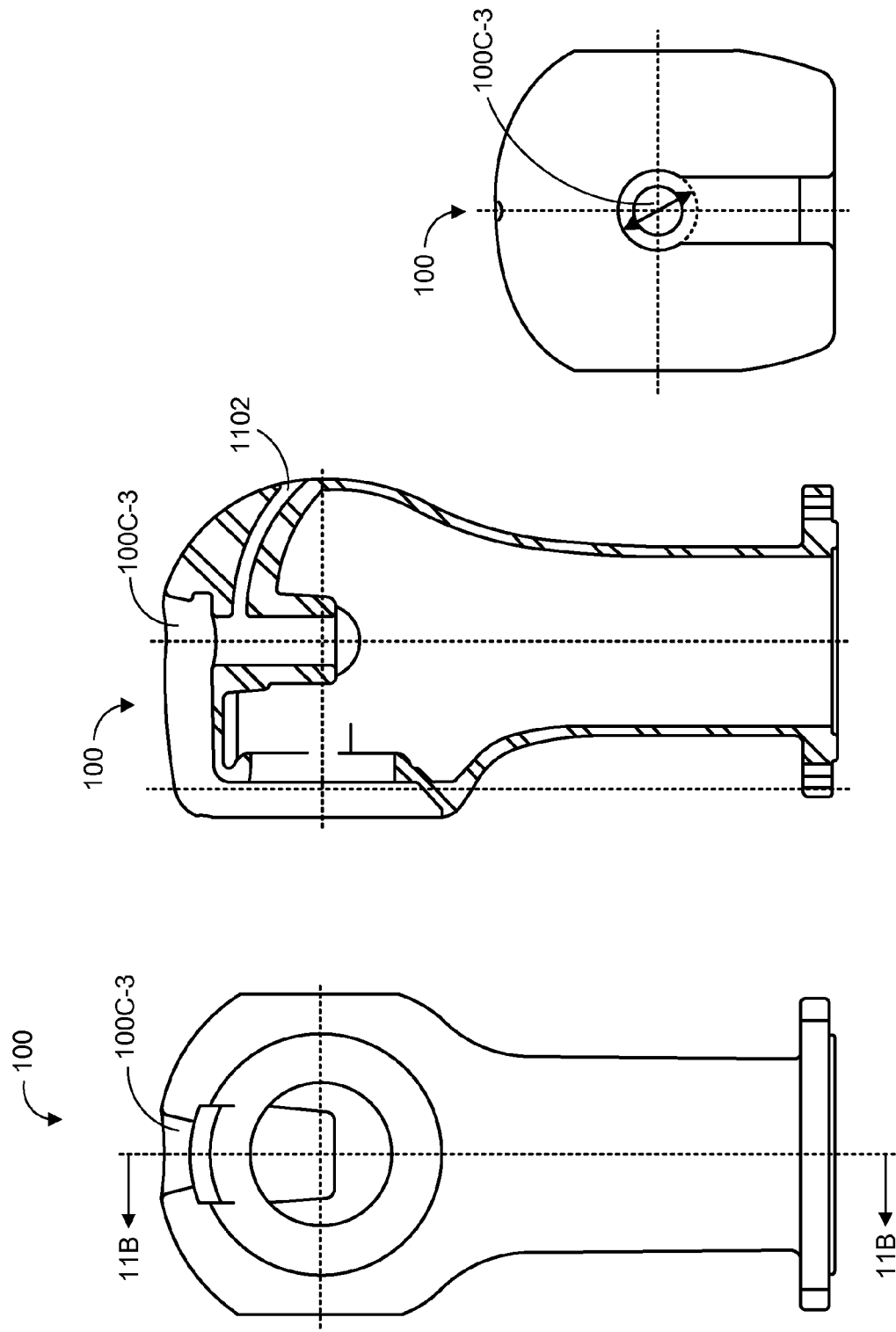

FIRE HYDRANT CONTROL VALVE

BACKGROUND

The present invention relates generally to fire hydrants and, more particularly, to a control valve for a fire hydrant.

Firefighters need quick and reliable access to water to fight fires safely and effectively. Typical fire hydrants are susceptible to jamming and blockage of the control valve. Jamming and blockage of the control valve prevents firefighters from accessing water via the fire hydrant. The control valve can be jammed or blocked due to insufficient drainage of the first hydrant. The control valve can also be jammed or blocked due to intrusion of tree roots into the control valve.

In view of the foregoing, there is a need for a fire hydrant that has a control valve that is less prone to being jammed and blocked.

SUMMARY

Broadly speaking, the present invention fills this need by providing a valve control device including an operating stem, a valve top plate, a valve seat rubber, a valve bottom plate, and a valve seat ring. The valve top plate has a conical base with at least three stabilizer arms extending therefrom. Each of the at least three stabilizer arms has a flat outer surface. The valve bottom plate secures the valve seat rubber between the valve bottom plate and a flat bottom surface of the valve top plate. The valve bottom plate, the valve seat rubber, and the conical base are mounted on the operating stem. The valve seat ring has multiple slots, each of the slots corresponding to one of the at least three stabilizer arms.

In one embodiment, the valve control device also includes an inlet elbow including a bottom inner surface and a contoured floor. In one embodiment, the at least three stabilizer arms are disposed around the conical base so that centerlines of the stabilizer arms are spaced apart by 90 and 135 degrees.

In one embodiment, the operating stem includes an operating nut. The operating nut can be disposed in a fire hydrant. In one embodiment, the fire hydrant is a locking fire hydrant including a locking cap mounted on the fire hydrant, the locking cap being configured to close off a main outlet port and an access to the operating nut.

In one embodiment, the conical base forms an angle of between 20 degrees and 60 degrees between the surface of the conical base and the flat bottom surface of the valve top plate.

In one embodiment, each of the at least three stabilizer arms has a triangular cross-sectional shape having an inner angle that is opposite the flat outer surface, the inner angle being between 20 degrees and 45 degrees.

In one embodiment, each of the at least three stabilizer arms has an inner edge opposite the outer surface, the inner edge having at least one of an angle and a curve having one or more radii.

In one embodiment, the valve seat ring includes at least one drain hole, the at least one drain hole being in fluid communication with an outlet portion of the valve control device with the valve control device a closed position. The at least one drain hole is covered by one of the at least three stabilizer arms when the valve control device is in an open position.

In accordance with another aspect of the invention, a standpipe drain system is provided. The standpipe drain system includes a standpipe and a valve control device. The valve control device includes an operating stem, a valve top plate, a valve seat rubber, a valve bottom plate, and a valve seat ring. The valve top plate has a conical base having at least three stabilizer arms, each of the at least three stabilizer arms having a flat outer surface. The valve bottom plate secures the valve seat rubber between the valve bottom plate and a flat bottom surface of the valve top plate. The valve bottom plate, the valve seat rubber, and the conical base are mounted on the operating stem. The valve seat ring has multiple slots, with each of the slots corresponding to one of the at least three stabilizer arms. The valve seat ring includes at least one drain hole, the at least one drain hole being in fluid communication with an outlet portion of the valve seat ring with the valve control device in a closed position. The at least one drain hole is covered by one of the at least three stabilizer arms when the valve control device is in an open position.

In one embodiment, the standpipe drain system also includes a drain ring including multiple drain nipples, each of the drain nipples having a drain port. In one embodiment, the standpipe drain system also includes a saturation ring including a drain channel and multiple notches and multiple outlet notches. A drain route is defined by the at least one drain port in the valve seat ring, the drain ports in the drain ring, and the notches and the outlet notches and the drain channel in the saturation ring. The drain route provides a fluid communication route between an outlet portion of the valve seat ring in the standpipe and an external portion of the standpipe.

In accordance with another aspect of the invention, a method of draining a standpipe is provided. This method includes closing a valve control device including uncovering a drain hole in a slot of a saturation ring, the drain hole being in an outlet portion of the saturation ring. The method also includes draining the contents of the standpipe through a drain route to an external portion of the standpipe. The drain route includes the at least one drain port in the valve seat ring, multiple drain ports in a drain ring, and multiple notches and multiple outlet notches and a drain channel in a saturation ring.

In one embodiment, the method of draining a standpipe can also include opening the valve control device including covering the drain hole in the slot of the saturation ring. In one embodiment, the drain hole in the slot of the saturation ring is covered by an outer surface of a stabilizer arm of a valve top plate. In one embodiment, the drain hole in the slot of the saturation ring is uncovered by moving an outer surface of a stabilizer arm of a valve top plate in the slot in the valve seat ring until the drain hole is uncovered.

In one embodiment, the standpipe is coupled to a fire hydrant. In one embodiment, the fire hydrant is a locking fire hydrant including a locking cap mounted on the fire hydrant, the locking cap being configured to close off a main outlet port and an access to the operating nut.

In accordance with another aspect of the invention, a locking fire hydrant with a valve access channel drain is provided. The locking fire hydrant includes a locking cap mounted on the fire hydrant, the locking cap being configured to close off a main outlet port, a valve access channel, and at least one drain channel in the valve access channel.

It is to be understood that the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate exemplary embodiments and together with the description serve to explain the principles of the invention, as claimed.

FIGS. 4A-4E show different views of the tri-arm valve top plate, in accordance with one embodiment of the invention.

FIGS. 5A-5G show different views of the valve seat ring, in accordance with one embodiment of the invention.

FIGS. 7A-7C show different views of the saturation ring, in accordance with one embodiment of the invention.

FIGS. 8A-8C show different views of the drain ring, in accordance with one embodiment of the invention.

FIGS. 9A-9F show different views of the inlet elbow and the valve control device 200, in accordance with one embodiment of the invention.

FIGS. 11A-11C show different views of the fire hydrant body, in accordance with one embodiment of the invention.

DETAILED DESCRIPTION

Several exemplary embodiments will now be described in detail with reference to the accompanying drawings.

Locking Fire Hydrant

Figure 1:
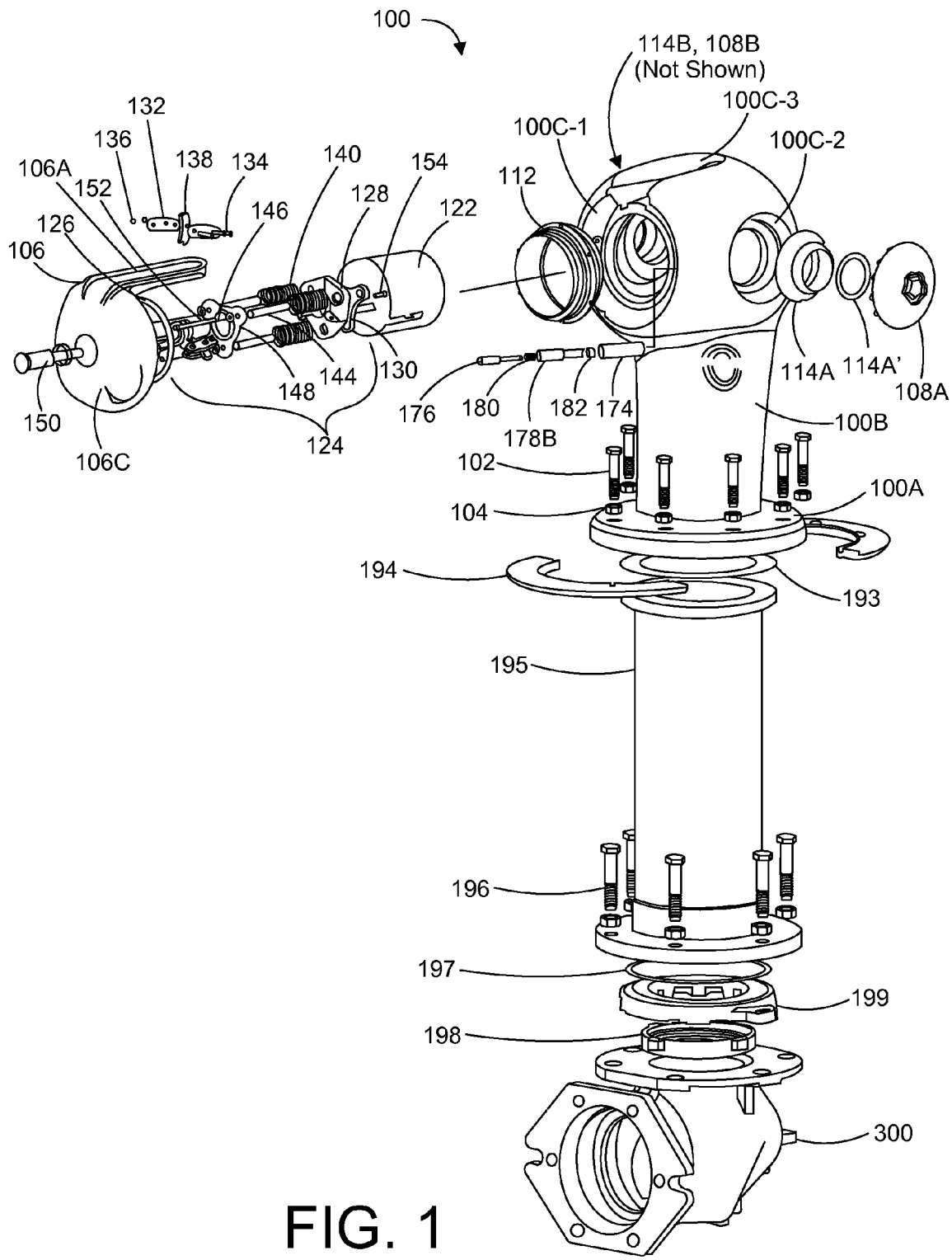
FIG. 1 is an exploded view of the components of a locking fire hydrant, standpipe and inlet elbow, in accordance with one embodiment of the invention.

FIG. 1 is an exploded view of the components of a locking fire hydrant, standpipe and inlet elbow, in accordance with one embodiment of the invention. As shown in FIG. 1, the locking fire hydrant includes a fire hydrant body 100, which is fastened to a standpipe 195 by bolts 102 and nuts 104. Locking cap 106 is mounted on fire hydrant body 100 to close off a main outlet port 112 defined in the fire hydrant body. Side caps 108A and 108B are mounted on fire hydrant body 100 to close off respective auxiliary side outlet ports 114A and 114B defined in the fire hydrant body. As used herein, the terms "side cap" and "auxiliary cap" are used interchangeably to refer to the cap used to close off an auxiliary outlet port defined in the fire hydrant body, i.e., any outlet port other than the main outlet port. Plunger assemblies 110A and 110B are provided in internal channels formed in fire hydrant body 100 on opposite sides of the main outlet port 112 defined in the fire hydrant body. When locking cap 106 is mounted on fire hydrant body 100, plunger assemblies 110A and 110B are actuated so that plungers extend into the recessed areas that surround the side outlet ports 114A and 114B defined in fire hydrant body 100. The plungers 110A and 110B interface with ratchet teeth formed on the back side of side caps 108A and 108B.

Also as shown in FIG. 1, fire hydrant body 100 includes flange 100A, neck 100B, and head 100C. Flange 100A has a plurality of holes formed therethrough and these holes are used to fasten the flange to a safety flange 194 using bolts 102 and nuts 104. The safety flange 194 captures seal 193 between the standpipe 195 and the flange 100A. As shown in FIG. 1, flange 100A is a generally circular flange that extends from the lower portion of neck 100B; however, it will be apparent to those skilled in the art that the configuration of the flange may be varied to meet the needs of particular situations. Fire hydrant body 100, as well as the other components of the locking fire hydrant described below, may be made of any suitable material, e.g., stainless steel, iron, ductile iron, brass, bronze, stainless steel, plastics, and composite materials and combinations thereof.

The standpipe 195 is coupled to the inlet elbow 300 using bolts 196. A saturation ring 199, a drain ring 198 and an inlet flange seal 197 are captured between the inlet flange on the standpipe 195 and the inlet elbow 300. The saturation ring 199 and the drain ring 198 are described in more detail below with reference to in FIGS. 7A-7C and 8A-8C.

Head 100C defines a hollow interior and has a generally rounded outer configuration that includes a number of recessed portions that are configured to protect components mounted thereon. In particular, head 100C includes main cap recess 100C-1, side cap recess 100C-2, and valve access channel 100C-3. Main cap recess 100C-1 surrounds cylinder 112, which has an inner surface and an outer surface. The inner surface of cylinder 112 defines a main outlet port of head 100C and the outer surface is threaded so that a complementarily threaded coupling member of a fire hose can be fastened thereon, as is well known to those skilled in the art.

Side cap recesses 100C-2 surround cylinders 114A and 114B, each of which has an inner surface and an outer surface. The respective inner surfaces define auxiliary side outlet ports of head 100C and the respective outer surfaces are threaded so that either a complementarily threaded coupling member of a fire hose or a threaded side cap (e.g., side cap 108A) can be fastened thereon.

Valve access channel 100C-3 is formed in the upper portion of head 100C and is configured to receive tongue 106A that extends from cap body 106C of locking cap 106. The tongue 106A prevents access to valve control device 200 (described in more detail below with reference to FIG. 2) disposed within fire hydrant body 100 when the locking cap 106 is secured to the head 100C. Additional details of the fire hydrant body 100 are explained in more detail in co-owned, co-pending U.S. application Ser. No. 12/482,366, filed on Jun. 10, 2009 and entitled "Locking Fire Hydrant" the disclosure of which is incorporated herein by reference in its entirety for all purposes. Additional details regarding a fire hydrant body that is configured to protect a locking cap from being tampered with by unauthorized users are set forth in U.S. Pat. No. 6,688,326 B1, the disclosure of which is incorporated herein by reference in its entirety for all purposes.

The locking mechanism 124 is surrounded by an optional lock cover 122, which has a generally cylindrical configuration. Lock cover 122 is provided to minimize the degree to which the locking mechanism is exposed to potentially harmful elements, e.g., dirt, foreign objects, etc. Lock cover 122 can be made from any suitable material. By way of example, lock cover 122 can be made of stainless steel or plastic. Gasket 126 is provided on the inner surface of locking cap 106 to provide a seal around the main outlet port when the locking cap is mounted on fire hydrant body 100.

The locking mechanism 124 includes top plate 128, which has a central hole and three peripheral holes formed therethrough. The outer surface of top plate 128 is configured to receive spring support 130, and the inner surface of the top plate is provided with three mounting anchors. Three pairs of support arms 132 connect top plate 128 to the inner surface of locking cap 106. Each support arm 132 has three holes formed therethrough. One end of each support arm 132 is fastened to one of the mounting anchors on the inner surface of top plate, and the opposite end of each support arm is fastened to one of mounting anchors 106C provided on the inner surface of locking cap 106. Support arms 132 are fastened using bolts 134 and hex nuts 136; however, it will be apparent to those skilled in the art that other suitable fasteners can be used. A cam gear 138 is rotatably fastened between each pair of support arms 132. Each cam gear 138 has a cam surface at one end thereof and a set of gear teeth at the opposite end thereof.

Three springs 140 are disposed between top plate 128 and cap plate 142, which has a central hole formed therethrough. In one embodiment, springs 140 are heavy duty die springs (at least about 2,500 pounds total spring pressure); however, it will be apparent to those skilled in the art that any suitable springs can be used. Each spring 140 is disposed on a spring shaft 144, which has a hollow interior that receives a screw 146. Each screw 146 is threaded into spring support 130. Washers 148 are disposed between the head of each screw 146 and the outer surface of cap plate 142.

Actuator pin 150 extends through a central aperture defined in locking cap 106. Rack 152 has a generally cylindrical configuration and a hollow interior and receives extension portion of actuator pin 150. The outer surface of rack 152 is provided with a number of cylindrical gears, which are configured to mate with the gear teeth provided at one end of each of cam gears 138.

To enable locking mechanism 124 to operate when lock cover 122 is in place, slots are provided in the locking cover. Each slot is located so that the cam surface of a cam gear 138 can extend therethrough and interface with a mating surface inside the fire hydrant body to lock and unlock locking mechanism 124.

Valve Control Device

Figure 2:
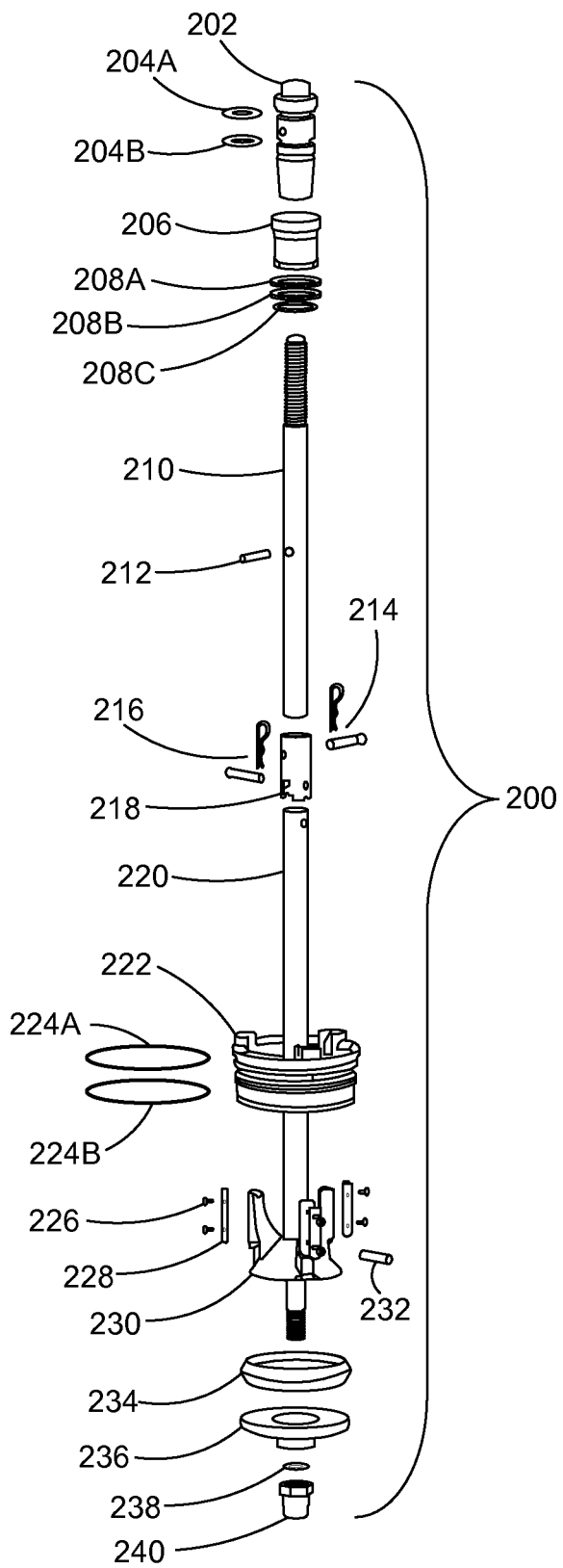
FIG. 2 is an exploded view of the components of a valve control device 200, in accordance with one embodiment of the invention.

FIG. 2 is an exploded view of the components of a valve control device 200, in accordance with one embodiment of the invention. The valve control device 200 includes an operating nut 202, seals 204A, 204B, operating nut sleeve 206, thrust washers 208A, 208B, and retaining ring 208C. The seals 204A, 204B provide a substantially water tight seal between the operating nut 202 and the valve access channel 100C-3 in the head 100C (see FIG. 1). The operating nut 202 is attached to an upper operating stem 210. One or more stem grooved pins 212 are included in the upper operating stem 210. The upper operating stem 210 is coupled to a lower operating stem 220 by a safety coupling 218 and coupling pins and keys 214, 216. The lower operating stem 220 passes through a valve seat ring 222.

A tri-arm valve top plate 230 is mounted on the lower operating stem 220. The valve seat rubber 234 and the valve bottom plate 236 also are mounted on the lower operating stem 220. A bottom plate nut 240 and seal 238 secure the valve seat rubber 234 to the valve bottom plate 236 on the lower operating stem 220. The valve seat rubber 234 can be formed from any suitable material (e.g., rubber, plastic, nylon, acetal resin materials (e.g., Delrin®), Teflon, polyethylene terephthalate (PET), ultra high molecular weight (UHMW) polyethylene, or other suitable materials and combinations thereof). The tri-arm valve top plate 230, the valve seat ring 222, and the valve bottom plate 236 are described in more detail below with reference to FIGS. 4A-4C, 5A-5F and 6A-6C. The operation of the valve control device 200 is described in more detail below with reference to FIGS. 9A-9D.

Figure 3A:
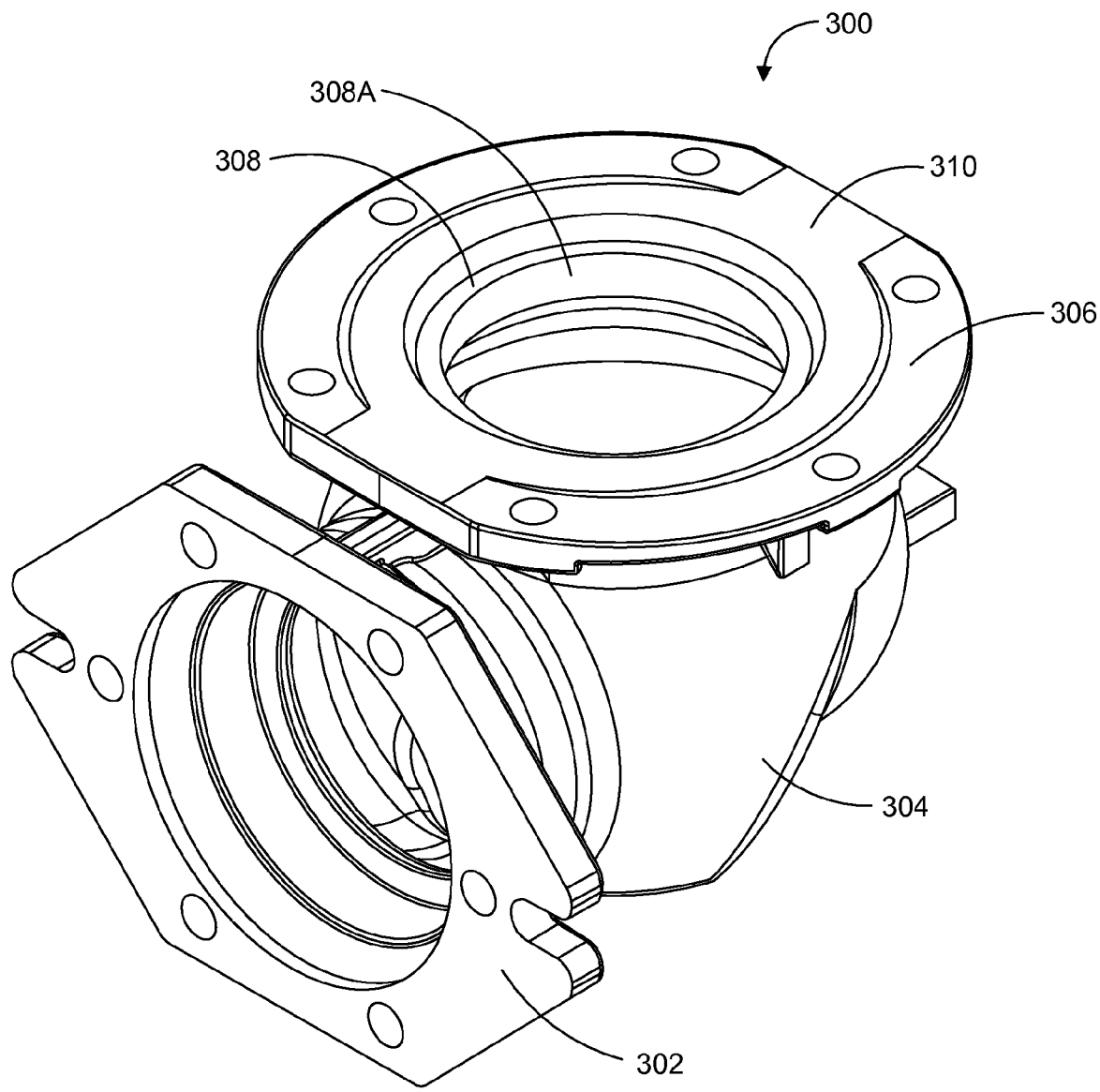
FIGS. 3A-3G show different views of the inlet elbow, in accordance with one embodiment of the invention.
Figure 3D:
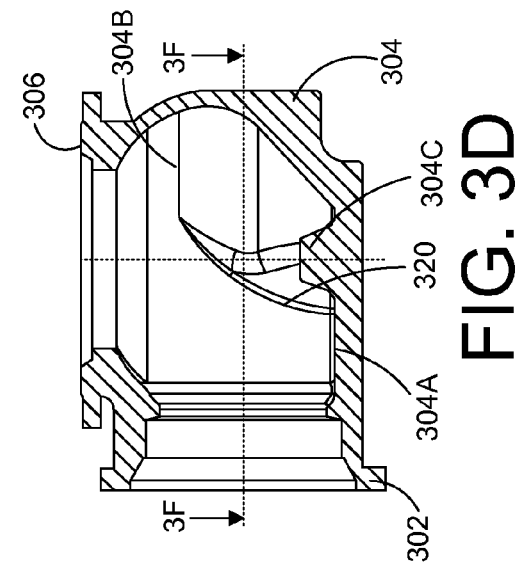
Figure 3G:
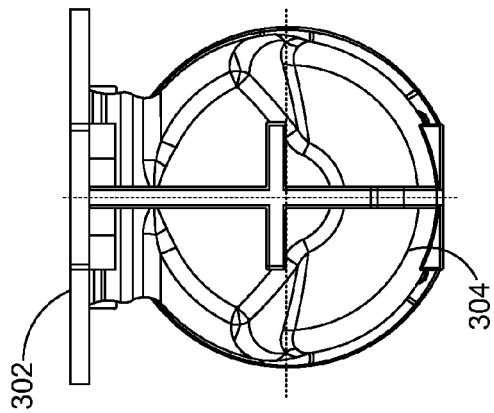
Figure 3C:
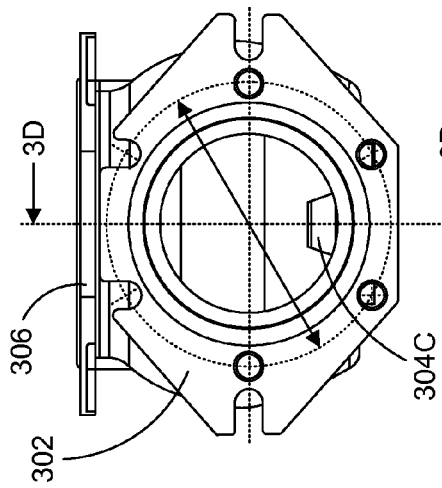
Figure 3F:
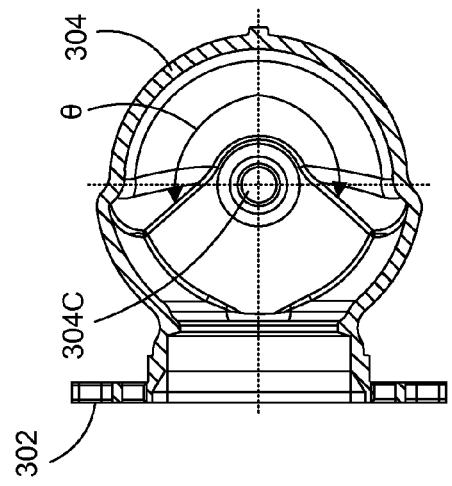
Figure 3B:
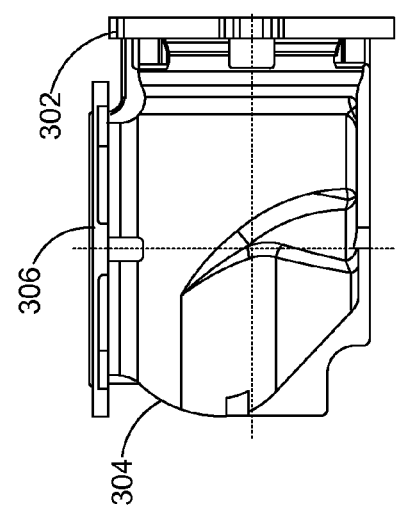
Figure 3E:
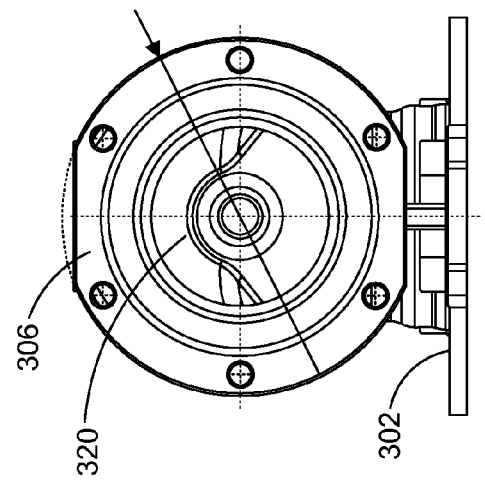

FIGS. 3A-3G show different views of the inlet elbow 300, in accordance with one embodiment of the invention. FIG. 3A is a perspective view of the inlet elbow 300, in accordance with one embodiment of the invention. FIG. 3B is a side view of the inlet elbow 300, in accordance with one embodiment of the invention. FIG. 3C is a front view of the inlet elbow 300, in accordance with one embodiment of the invention. FIG. 3D is a sectional view 3D-3D (see FIG. 3C) of the inlet elbow 300, in accordance with one embodiment of the invention. FIG. 3E is a top view of the inlet elbow 300, in accordance with one embodiment of the invention. FIG. 3F is a sectional view 3F-3F (see FIG. 3D) of the inlet elbow 300, in accordance with one embodiment of the invention. FIG. 3G is a bottom view of the inlet elbow 300, in accordance with one embodiment of the invention.

Referring now to FIG. 3A, the inlet elbow 300 includes a supply flange 302, an elbow body 304 and an outlet flange 306. The outlet flange 306 includes a drain ring recess 308 and a saturation ring seat 310. The drain ring 198 fits into the drain ring recess 308 and the saturation ring 199 fits over the drain ring and rests on the saturation ring seat 310. The operation of the drain ring 198, drain ring recess 308, saturation ring 199 and saturation ring seat 310 are described in more detail below with reference to FIGS. 9A-9D and 10A.

As shown in FIGS. 3D and 3E, the elbow body 304 has a contoured floor 320. The contoured floor 320 is raised and/or curved to improve the flow characteristics of the water flowing through the elbow body 304 and though the valve control device 200. The contoured floor 320 curves upward from the bottom inner surface 304A of the elbow body 304 to a plateau 304B that is below the valve control device 200 (FIG. 3D).

A protrusion 304C receives the bottom plate nut 240 and allows the valve control device 200 to descend downward into the elbow body 304 until the bottom plate 236 contacts the plateau 304B and/or the bottom plate nut contacts the protrusion. The plateau 304B spans an angle θ between about 270 degrees and about 120 degrees (see FIG. 3F). The floor 320 can be straight or curved between the bottom inner surface 304A to the plateau 304B. The floor 320 can be a combination of curved and/or flat surfaces between the bottom inner surface 304A to the plateau 304B.

Figure 4A:
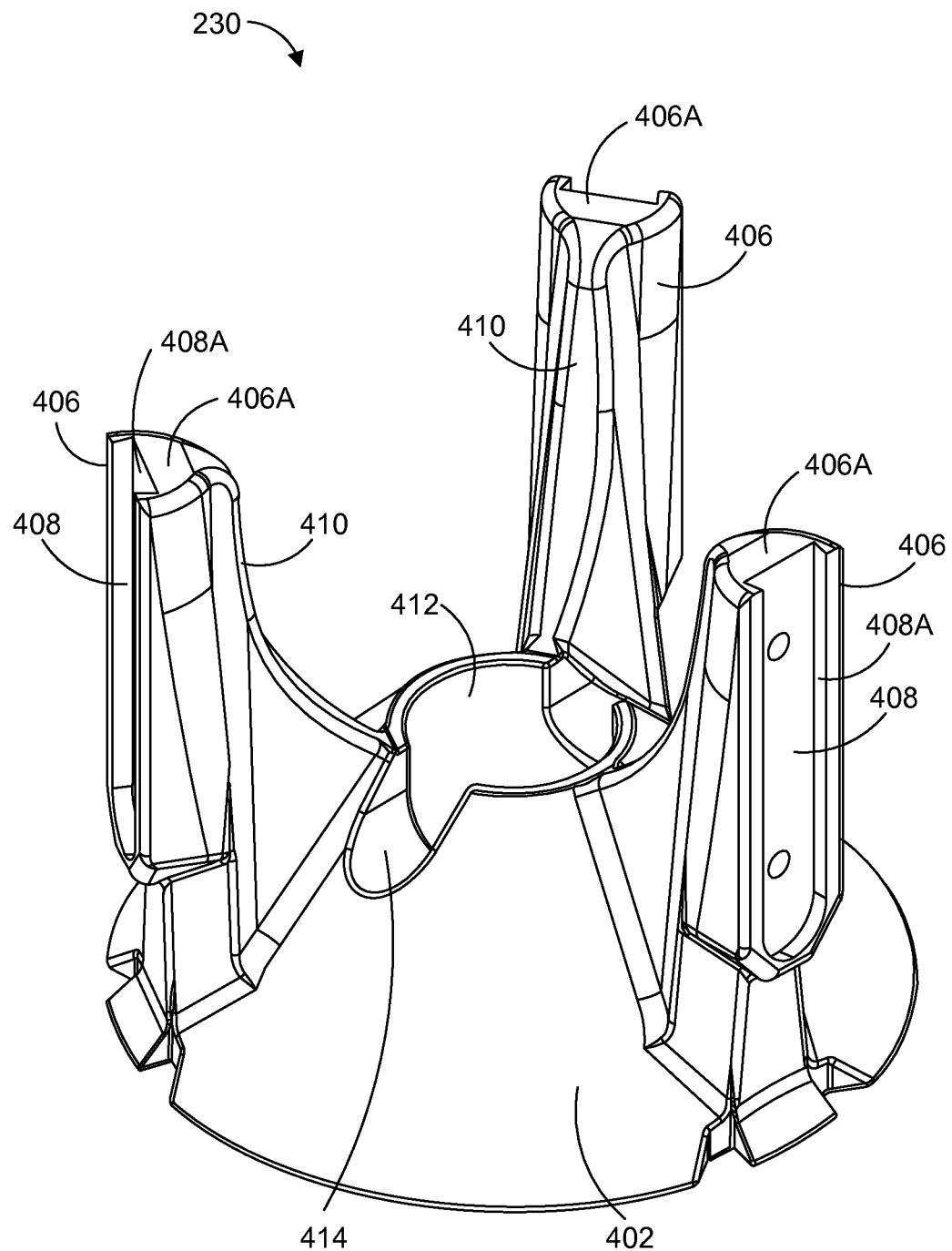

FIGS. 4A-4E show different views of the tri-arm valve top plate 230, in accordance with one embodiment of the invention. FIG. 4A is a perspective view of the tri-arm valve top plate 230, in accordance with one embodiment of the invention. FIG. 4B is a top view of the tri-arm valve top plate 230, in accordance with one embodiment of the invention. FIG. 4C is a bottom view of the tri-arm valve top plate 230, in accordance with one embodiment of the invention. FIG. 4D is a side view of the tri-arm valve top plate 230, in accordance with one embodiment of the invention. FIG. 4E is a sectional view 4E-4E (see FIG. 4D) of the tri-arm valve top plate 230, in accordance with one embodiment of the invention. The tri-arm valve top plate 230 has a substantially conical base 402 having an angle α of between about 20 degrees and about 60 degrees between the surface of the conical base and the substantially flat bottom surface 404 of the tri-arm valve top plate 230 (see FIG. 4E).

The tri-arm valve top plate 230 includes three substantially equally spaced stabilizer arms 406. The three stabilizer arms 406 can be spaced at angle β of between about 90 degrees and about 135 degrees between the respective centerlines of the stabilizer arms (see FIG. 4B). It should be understood that while the tri-arm valve top plate 230 is shown and described with three stabilizer arms, more than three (e.g., four or five or more) stabilizer arms could be included.

The stabilizer arms 406 have a substantially flat outer surface 408. The outer surfaces 408 fit into slots 502 of the valve seat ring 222 as will be described in more detail below. Replaceable inserts 228 can be installed on the outer surfaces 408 of the stabilizer arms 406 (see FIG. 4E). The replaceable inserts 228 can be secured to the outer surfaces 408 with fasteners 226. The outer surfaces 408 can include recesses 408A that substantially surround the replaceable inserts 228 on one or more sides of the replaceable inserts.

The stabilizer arms 406 have a substantially triangular cross section shape having an inner angle Ω that is opposite to the outer surfaces 408 (see FIG. 4B). The inner angle Ω is between about 20 degrees and about 45 degrees.

The stabilizer arms 406 have an angled and/or tapered inner surface 410. The inner edge 410 extends from the conical base 402 to the ends 406A of each of the stabilizer arms. The inner edge 410 can have a convex curve 410A of one or more radii and/or straight portions as shown in FIGS. 4D and 4E. The convex curve 410A having a corresponding origin 410B of each of the one or more radii 410C disposed in an inward direction of at least one of toward or beyond a centerline 230A of the valve top plate 230. The tri-arm valve top plate 230 includes a valve top central channel 412 in the center of the tri-arm valve top plate. The tri-arm valve top plate 230 also includes a stem pin groove 414. A stem pin 232 passes through the stem pin groove 414 and a stem bore in the lower operating stem 220 (see FIG. 2).

Figure 5A:
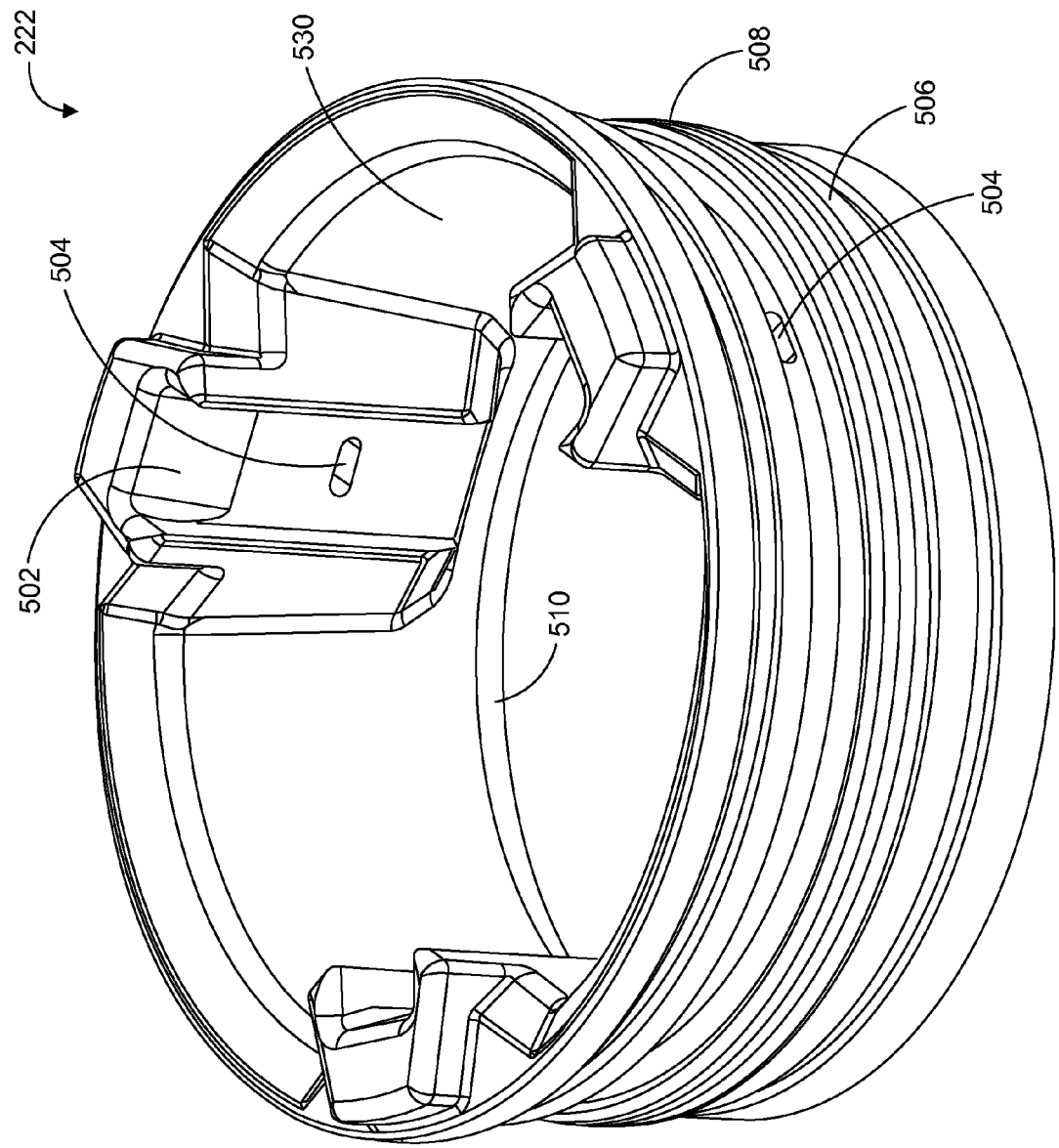
Figure 5G:
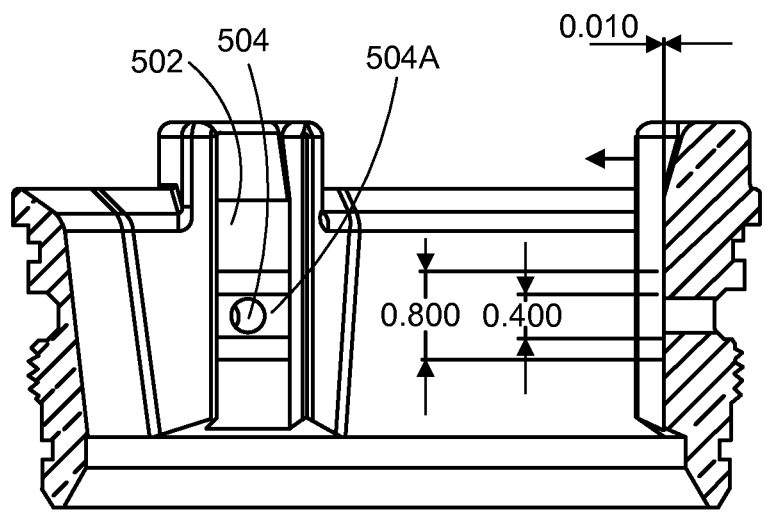

FIGS. 5A-5G show different views of the valve seat ring 222, in accordance with one embodiment of the invention. FIG. 5A is a perspective view of the valve seat ring 222, in accordance with one embodiment of the invention. FIG. 5B is a top view of the valve seat ring 222, in accordance with one embodiment of the invention. FIG. 5C is a side view of the valve seat ring 222, in accordance with one embodiment of the invention. FIGS. 5D and 5G are sectional views 5D-5D (see FIG. 5C) view of the valve seat ring 222, in accordance with one embodiment of the invention. FIG. 5E is a detail view of the slots 502 in the valve seat ring 222, in accordance with one embodiment of the invention. FIG. 5F is a detail view of the drain holes 504 in the valve seat ring 222, in accordance with one embodiment of the invention.

The slot 502 has a depth tolerance of about 0.003" from a center 552 of the valve seat ring 222. A bottom portion 506 of the valve seat ring 222 seats into the inlet elbow 300. By way of example, the valve seat ring 222 can seat into the inner diameter 308A of the drain ring recess 308 in the outlet flange 306 of the inlet elbow 300 (see FIG. 3A).

The valve seat ring 222 can include a threaded portion 508. The threaded portion 508 can thread into the drain ring 198 (see FIG. 1). At least one of the slots 502 includes at least one drain port 504. The drain port 504 can have any suitable shape e.g., round, rectangular, oval or elliptical. The valve seat ring 222 includes a valve seat 510 on the inner surface of the bottom portion 506. The valve seat 510 has an angle λ, of between about 30 and about 89 degrees (see FIG. 5D). As will be explained in more detail below, the angle λ, of the valve seat 510 is selected to receive the seat valve rubber 234 and close the valve control device 200 to stop water flow through the inlet elbow 300 and into the standpipe 195.

Referring to FIG. 5G, the drain port 504 can be round or other shape. It should be understood that while the drain ports 504 are shown in a substantially round or oval shape the drain port shape can be round, square or other shape. The drain ports 504 are in the slots 502 at the correct height such that the tri-arm valve top plate 230 can cover and uncover the holes at the correct times in the opening and closing of the valve as described in more detail below.

As shown in FIG. 5G, the drain ports 504 are included in a slightly raised plateau 504A. The slightly raised plateau 504A is raised about 0.010 inch+/−about 0.001 inch from the slot 502. The raised plateau 504A can aid in sealing the drain ports 504 when the drain ports are covered by the tri-arm valve top plate 230. The raised plateau 504A provides a surface area to form a seal with the replaceable inserts 228 installed on the outer surfaces 408 of the stabilizer arms 406 of the tri-arm valve top plate 230. The surface area of the raised plateau 504A is less than the surface area of the slot 502. The surface area of the raised plateau 504A can be less than about one third of the surface area of the slot 502. By way of example, the surface area of the raised plateau 504A can be less than about one fifth of the surface area of the slot 502.

The smaller surface area of the raised plateau 504A improves the sealing function of the tri-arm valve top plate 230. The smaller surface area of the raised plateau 504A also reduces the friction between the tri-arm valve top plate 230 and the slot 502, thus providing a smoother, longer lasting, more reliable operation of the valve control device 200.

Figure 6A:
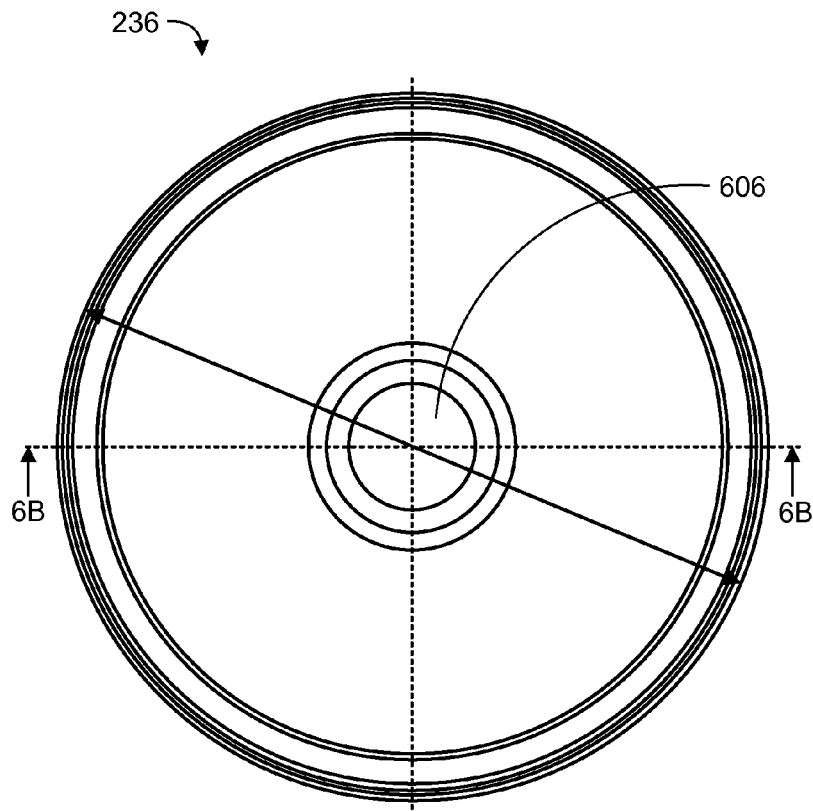
FIGS. 6A-6C show different views of the valve bottom plate, in accordance with one embodiment of the invention.
Figure 6B:
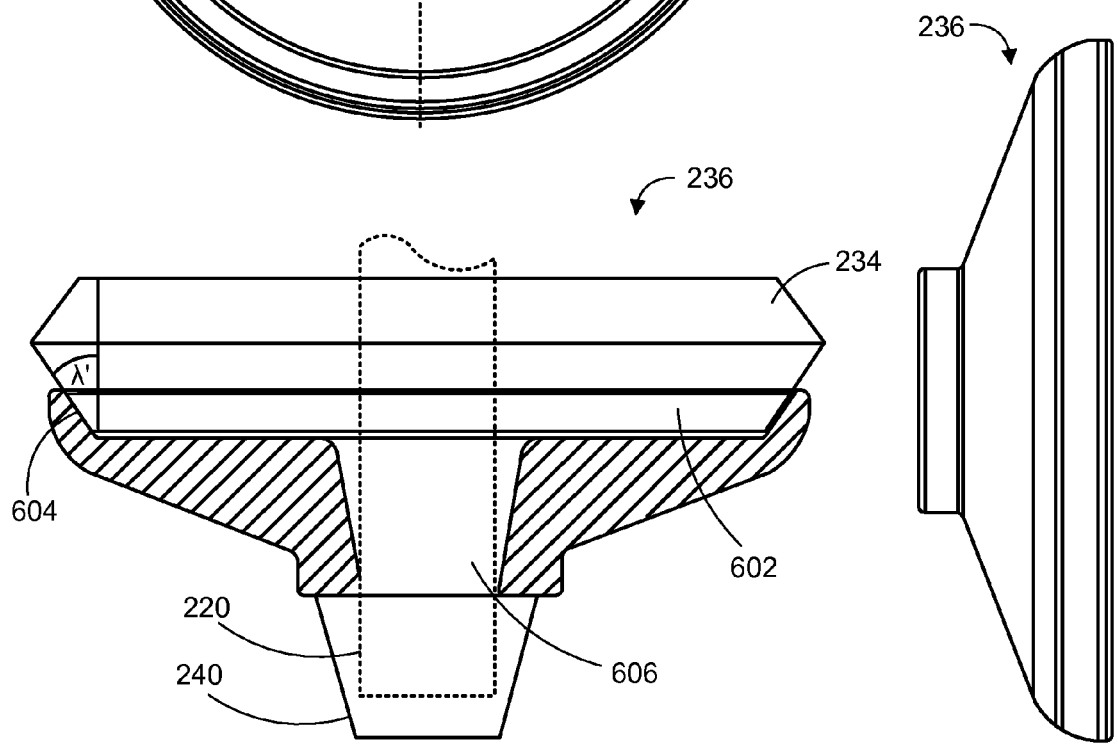
Figure 6C:
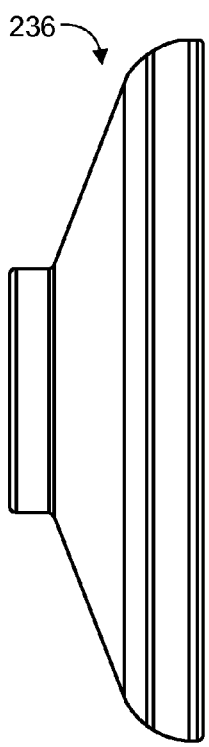

FIGS. 6A-6C show different views of the valve bottom plate 236, in accordance with one embodiment of the invention. FIG. 6A is a top view of the valve bottom plate 236, in accordance with one embodiment of the invention. FIG. 6B is a sectional view 6B-6B (see FIG. 6A) of the valve bottom plate 236, in accordance with one embodiment of the invention. FIG. 6C is a side view of the valve bottom plate 236, in accordance with one embodiment of the invention. As shown in FIG. 6B, the valve bottom plate 236 has recess 602. The recess 602 has a valve seat 604. The valve seat 604 has an angle λ' of between about 30 and about 89 degrees. The recess 602 receives the seat valve rubber 234. The seat valve rubber 234 is secured between the valve bottom plate 236 and the bottom surface 404 of the tri-arm valve top plate 230.

The valve bottom plate 236 also includes a valve bottom plate central channel 606. The lower operating stem 220 (see FIG. 2) passes through the valve top central channel 412 of the tri-arm valve top plate 230 and the valve seat rubber 234 and through the valve bottom plate central channel 606. The valve bottom plate 236, the valve seat rubber 234 and the tri-arm valve top plate 230 are secured to the lower operating stem 220 between the stem pin groove 414 (see FIG. 4A) and the bottom plate nut 240.

Standpipe Drain System

FIGS. 7A-7C show different views of the saturation ring 199, in accordance with one embodiment of the invention. FIG. 7A is a top view of the saturation ring 199, in accordance with one embodiment of the invention. FIG. 7B is a side view of the saturation ring 199, in accordance with one embodiment of the invention. FIG. 7C is a sectional view 7C-7C (see FIG. 7A) of the saturation ring 199, in accordance with one embodiment of the invention. The saturation ring 199 includes two or more bolt holes 702. The bolt holes are aligned with the bolts 196 that couple the standpipe 195 to the inlet elbow 300 (see FIG. 1). The saturation ring 199 includes a substantially flat top seat 708. The top seat 708 includes a seal groove 708A. The underside of the saturation ring 199 includes a drain channel 710 and multiple notches 704 and outlet notches 706.

FIGS. 8A-8C show different views of the drain ring 198, in accordance with one embodiment of the invention. FIG. 8A is a top view of the drain ring 198, in accordance with one embodiment of the invention. FIG. 8B is a sectional view 8B-8B (see FIG. 8A) of the drain ring 198, in accordance with one embodiment of the invention. FIG. 8C is a side view of the drain ring 198, in accordance with one embodiment of the invention. As shown in FIG. 8B, the drain ring 198 includes a threaded portion 802. The threaded portion 802 meshes with the threaded portion 508 of the valve seat ring 222.

The drain ring 198 also includes multiple drain nipples 804. Each of the drain nipples 804 includes a drain port 806. The drain nipples 804 substantially aligned with the notches 704 in the saturation ring 199. Each of the drain ports 806 can be aligned with one of the drain ports 504 in the valve seat ring 222 (see FIG. 5A).

Figure 9C:
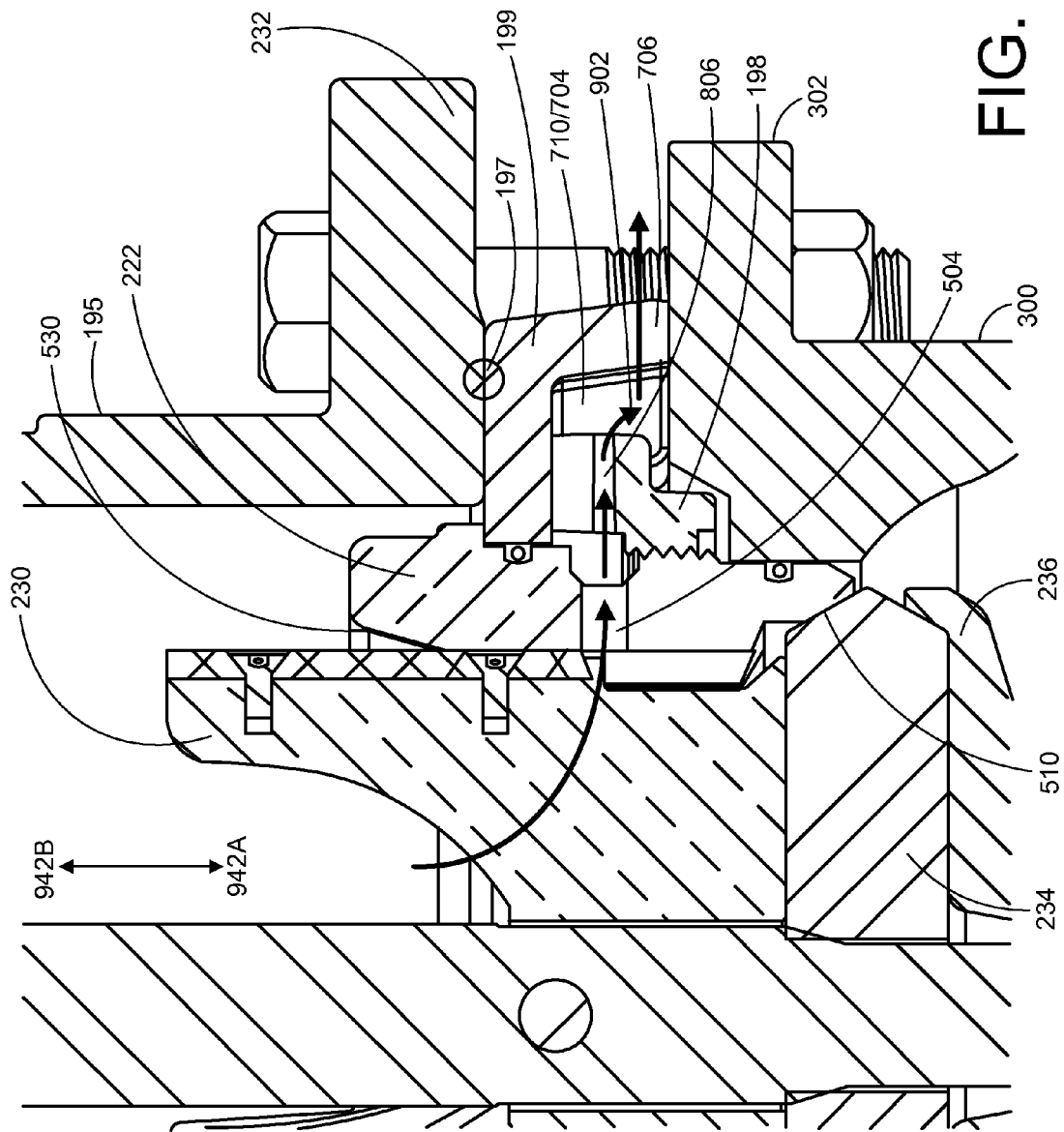
Figure 9D:
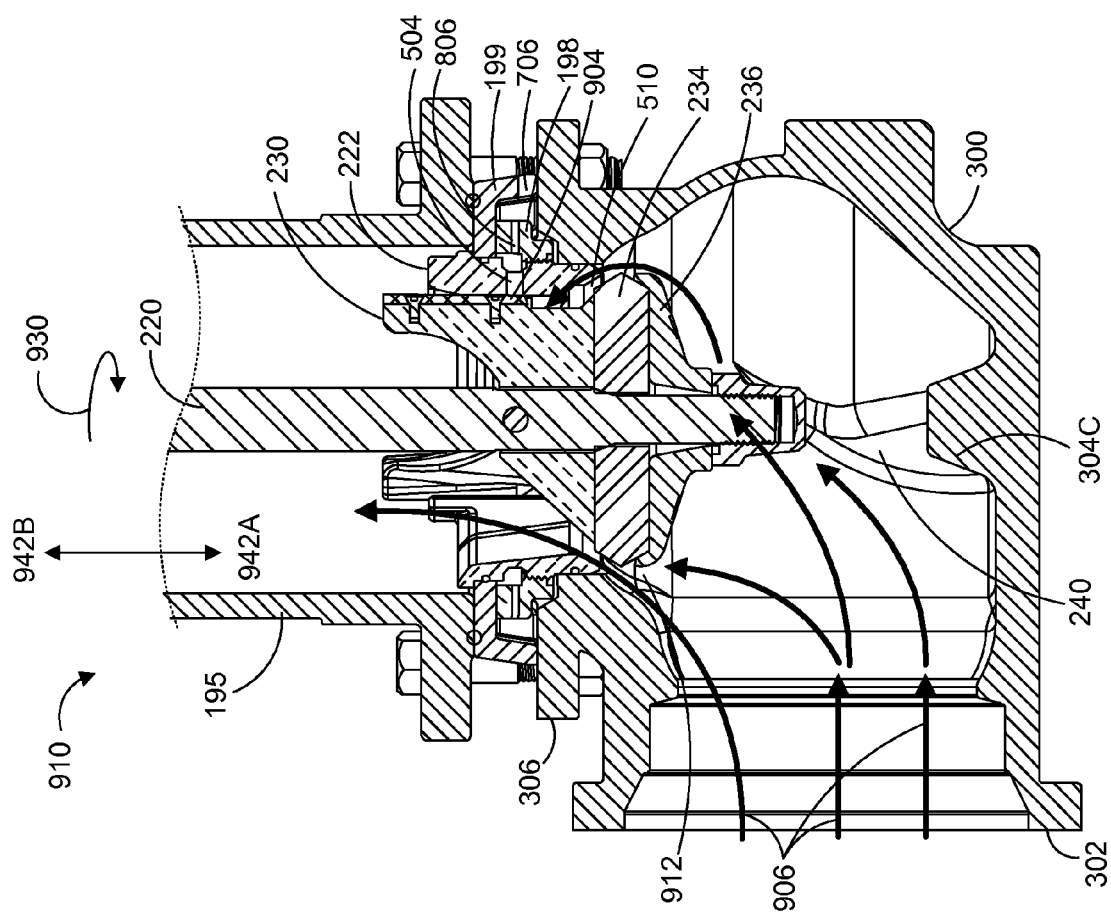
Figure 9E:
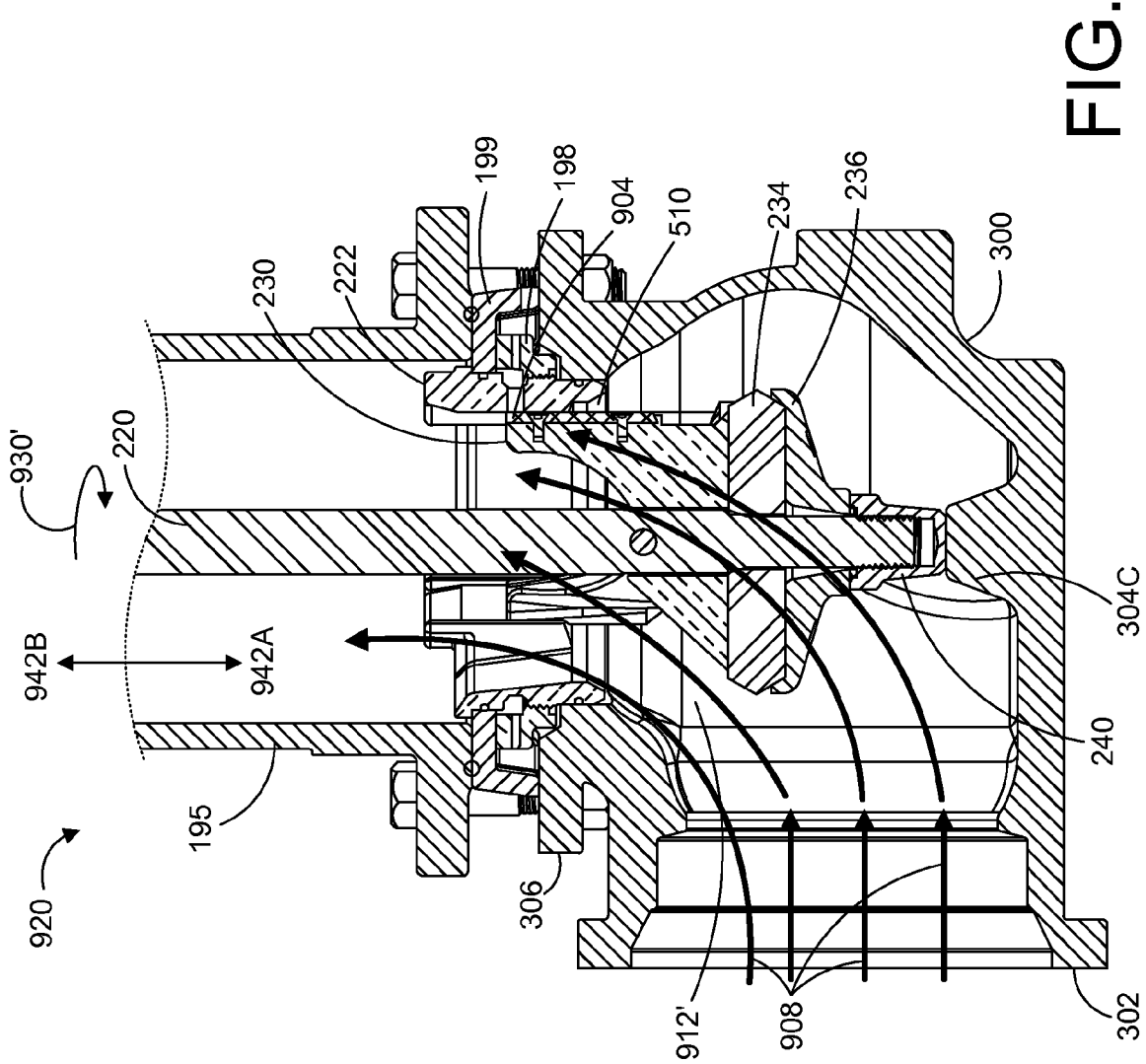
Figure 9F:
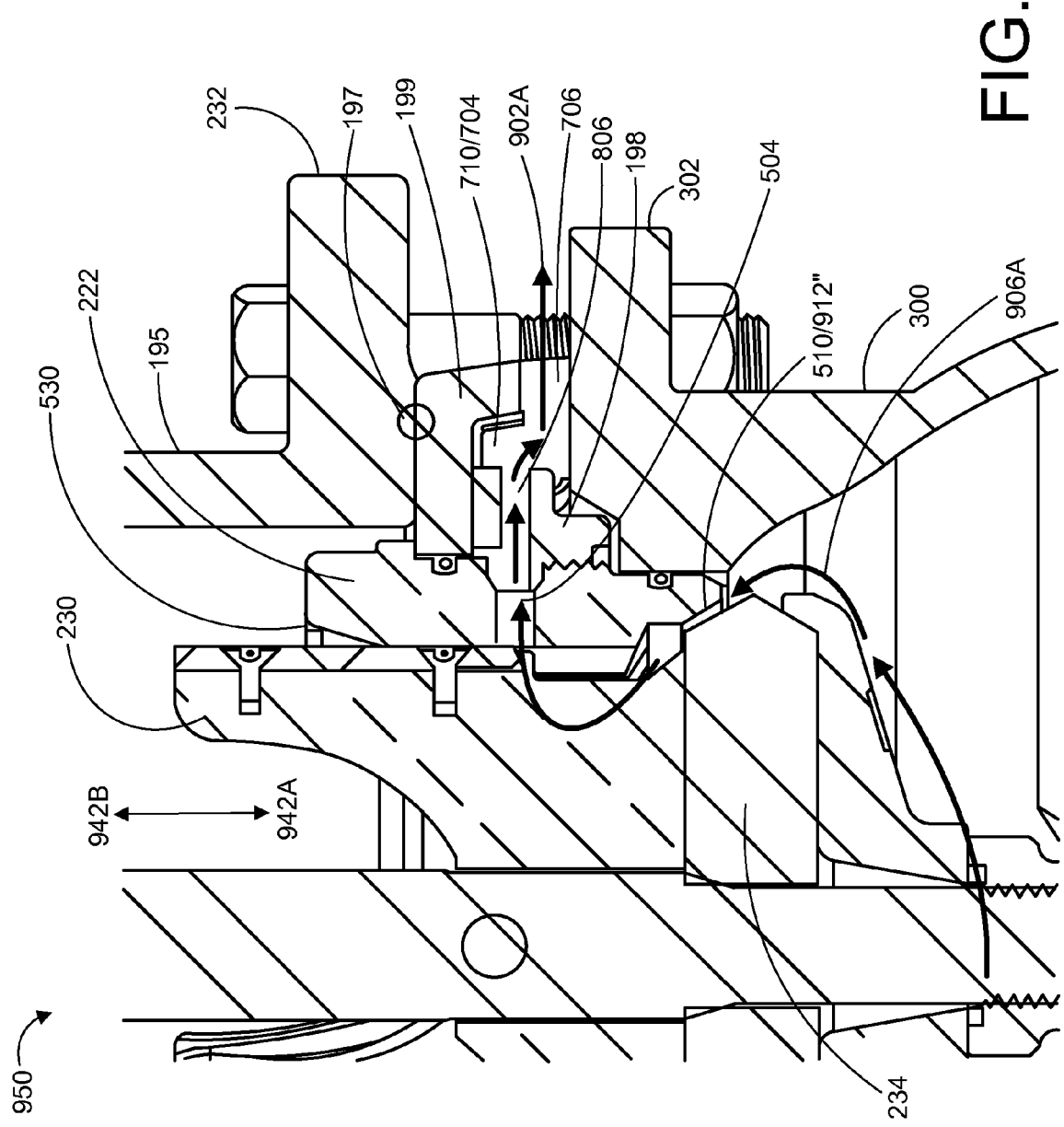

FIGS. 9A-9F show different views of the inlet elbow 300 and the valve control device 200, in accordance with one embodiment of the invention. FIG. 9A is an inlet view of the inlet elbow 300 and the valve control device 200, in accordance with one embodiment of the invention. FIG. 9B is a sectional view 9B-9B (see FIG. 9A) of the inlet elbow 300 and the valve control device 200 in a closed position, in accordance with one embodiment of the invention. FIG. 9C is a detailed view of the inlet elbow 300 and the valve control device 200 in the closed position, in accordance with one embodiment of the invention. FIG. 9D is a sectional view 9B-9B (see FIG. 9A) of the inlet elbow 300 and the valve control device 200 in a partially opened position, in accordance with one embodiment of the invention. FIG. 9E is a sectional view 9B-9B of the inlet elbow 300 and the valve control device 200 in a fully open position, in accordance with one embodiment of the invention. FIG. 9F is a sectional view 9B-9B (see FIG. 9A) of the inlet elbow 300 and the valve control device 200 in a slightly open position 950, in accordance with one embodiment of the invention.

A circuitous drain route 902 is formed between the inside of the standpipe 195 (e.g., an outlet portion 530 of the valve seat ring 222) and the outside of the standpipe. The circuitous drain route 902 is defined by the drain ports 504 in the valve seat ring 222, the drain ports 806 in the drain ring 198 and the notches 704, outlet notches 706 and drain channel 710 in the saturation ring 199. The circuitous drain route 902 allows the standpipe 195 to drain when the valve control device 200 is in the closed position 900. The circuitous drain route 902 prevents intrusion and blockage by dirt and plant roots (e.g., trees, bushes and other plant root systems). The circuitous drain route 902 is closed or cut off by the outer surfaces 408 of the stabilizer arms 406 of the tri-arm valve top plate 230. By way of example, when the valve control device 200 is in the partially open position 910 (FIG. 9D) as compared to the fully open position 920 (FIG. 9E). The circuitous drain route 902 appears to be shown as being a direct through path, however, it should be understood that the drain holes 504, the outlet notches 706 and the drain ports 806 are offset radially around the circumference. The water draining through the circuitous drain route 902 turns left or right radially from each of the drain holes 504 to pass through one or more drain ports 806 and again turns left or right radially from each of the drain ports to one or more of the outlet notches 706.

The valve control device 200 also includes a pressure drain position 950 as shown in FIG. 9F. As the valve control device 200 moves to a slightly open position to form a very small gap 912" is formed between the seat valve rubber 234 and the valve seat 510 in the valve seat ring 222. Simultaneously, the tri-arm valve top plate 230 slightly uncovers the drain holes 504 in the valve seat ring 222. As water pressure still exists inside the valve control device 200, the water pressurizes the circuitous drain route 902. By way of example, the water pressure causes the water to rush out the drain holes 504 and the drain ports 806 in the drain ring 198 and the notches 704, outlet notches 706 and drain channel 710 in the saturation ring 199, thus flushing out the drain route 902. Flushing out the drain route 902 substantially removes any debris that might have accumulated in the drain route. The debris might originate from the water flowing through the valve control device 200 or from the valve control device 200, fire hydrant body 100, standpipe 195 and/or the inlet elbow 300. The debris might also or alternatively originate from sources external of the fire hydrant body 100, standpipe 195 and/or the inlet elbow 300 such as sand, gravel, dirt, insects, worms and/or plant/tree roots.

Figure 10:
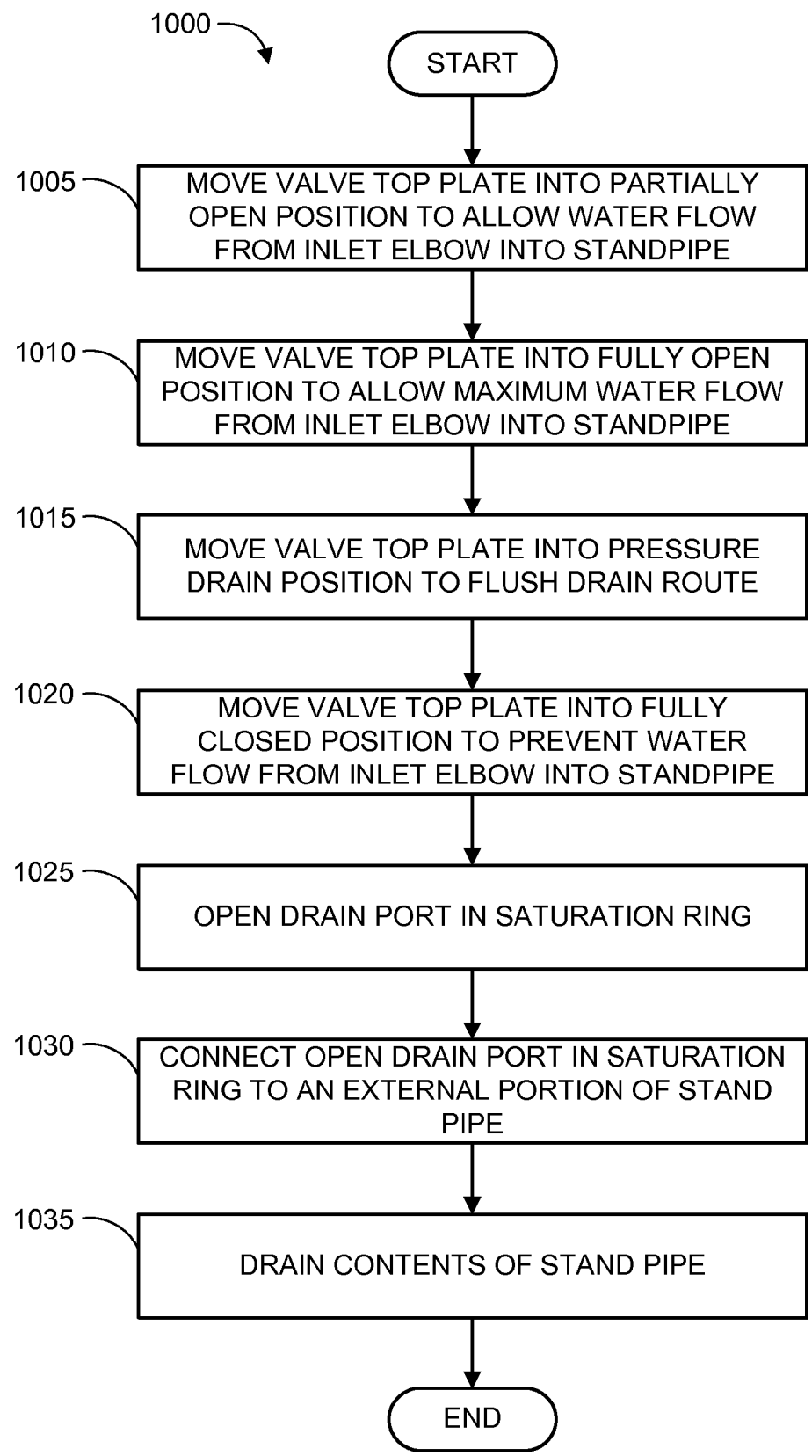
FIG. 10 is a flow chart diagram illustrating the method operations performed in operating the valve control device, in accordance with one embodiment of the invention.

FIG. 10 is a flow chart diagram 1000 illustrating the method operations performed in operating the valve control device 200, in accordance with one embodiment of the invention. In an operation 1005, the operating nut 202 is partially rotated in a first direction 930 as shown in FIG. 9D. Partially rotating the operating nut 202 applies a downward pressure on the upper operating stem 210, lower operating stem 220 and the valve top plate 230 causing the valve top plate to move downward. Moving the valve top plate 230 downward moves the valve top plate into the partially open position 910. In the partially open position 910, a relatively small gap 912 is formed between the seat valve rubber 234 and the valve seat 510 in the valve seat ring 222. The relatively small gap 912 allows a partial water flow 906 through the inlet elbow 300 and past the seat valve rubber 234 into the standpipe 195. The three (or more) stabilizer arms 406 and the conical base 402 of the valve top plate 230 improves flow and stability under partial water flow conditions that can jam a typical valve control device.

In an operation 1010, the operating nut 202 is fully rotated in the first direction 930' to a stopping position as shown in FIG. 9E. Fully rotating the operating nut 202 in the first direction 930' fully depresses the upper operating stem 210, lower operating stem 220 and the valve top plate 230 in direction 942A. Fully depressing the valve top plate 230 moves the valve top plate into the fully open position 920. In the fully open position 920, a maximum open gap 912' is formed between the seat valve rubber 234 and the valve seat 510 in the valve seat ring 222. The maximum open gap 912' allows a maximum water flow 908 through the inlet elbow 300 and past the seat valve rubber 234 into the standpipe 195.

The contoured floor 320 of the elbow body 304 reduces the turbulence and otherwise smoothes the water flow 908 through the maximum open gap 912'. The substantially triangular cross section shape of the three (or more) stabilizer arms 406 and the conical base 402 of the valve top plate 230 also reduces the turbulence in and otherwise smoothes the water flow 908. The reduced turbulence and smoothed water flow 908 allows a greater quantity of water to pass through the maximum open gap 912' with a reduced pressure drop through the valve control device 200.

In an operation 1015, the operating nut 202 is partially rotated in a second direction 940 opposite the first direction 930 approaching a fully closed position but remaining partially open as shown in FIG. 9F. Rotating the operating nut 202 in the second direction 940 draws the upper operating stem 210, lower operating stem 220 and the valve top plate 230 partially upward in direction 942B. Drawing the valve top plate 230 partially upward moves the valve top plate into the pressure drain position 950. In the pressure drain position 950, a relatively small gap 912" remains between the seat valve rubber 234 and the valve seat 510 in the valve seat ring 222. The valve top plate 230 opens at least one drain port 504 in the valve seat ring 222, thus opening the circuitous drain route 902. As the water in the standpipe 195 and the valve control device 200 is still pressurized, then the water will flow under that pressure through the circuitous drain route 902 and flush the circuitous drain route.

In an operation 1020, the operating nut 202 is fully rotated in a second direction 940 opposite the first direction 930 to a stopping position as shown in FIG. 9B. Fully rotating the operating nut 202 in the second direction 940 draws the upper operating stem 210, lower operating stem 220 and the valve top plate 230 fully upward in direction 942B. Drawing the valve top plate 230 fully upward moves the valve top plate into the fully closed position 920. In the fully closed position 920, the seat valve rubber 234 seals against the valve seat 510 in the valve seat ring 222, thus cutting off all water flow 906, 908 through the inlet elbow 300 and past the seat valve rubber 234 into the standpipe 195. As the valve top plate 230 moves from the fully open position 930, through the partially open position 910 toward the fully closed position 920, the three (or more) stabilizer arms 406 and the conical base 402 of the valve top plate 230 improves flow and stability under partial water flow conditions that can jam a typical valve control device.

In an operation 1025, closing the valve control device 200 uncovers at least one drain hole 504 in a slot of a saturation ring 222. The drain hole 504 is in an outlet portion of the valve seat ring 222. In an operation 1030, the circuitous drain route 902 is opened when the valve top plate is in the fully closed position 920.

In an operation 1035, the water contained in the standpipe 195 drains through the circuitous drain route 902 to an external portion standpipe 195. The circuitous drain route 902 includes the at least one drain port 504 in the valve seat ring 222, a one or more drain ports 806 in the drain ring 198 and at least one of the notches 704 and at least one of the outlet notches 706 and the drain channel 710 in the saturation ring 199.

Valve Access Channel Drain System

FIGS. 11A-11C show different views of the fire hydrant body 100, in accordance with one embodiment of the invention. FIG. 11A is a front view of the fire hydrant body 100, in accordance with one embodiment of the invention. FIG. 11B is a sectional view 11B-11B (see FIG. 11A) of the fire hydrant body 100, in accordance with one embodiment of the invention. FIG. 11C is a top view of the fire hydrant body 100, in accordance with one embodiment of the invention. The fire hydrant body 100 includes a valve access channel drain port 1102. The valve access channel drain port drains any water from the valve access channel 100C-3. Draining the water from the valve access channel 100C-3 helps prevent corrosion and freezing that may interfere with proper operation of the locking cap 106 and/or the valve control device 200.

Figure 12B:
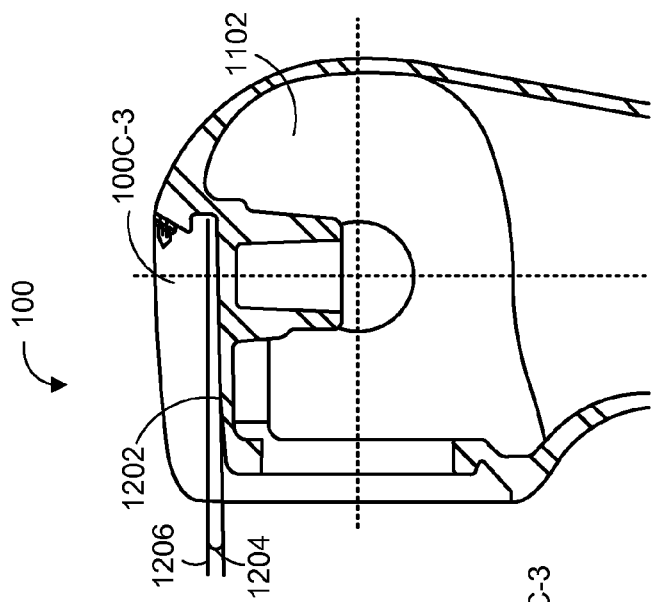
FIGS. 12A-12C show different views of the fire hydrant body, in accordance with one embodiment of the invention.
Figure 12C:
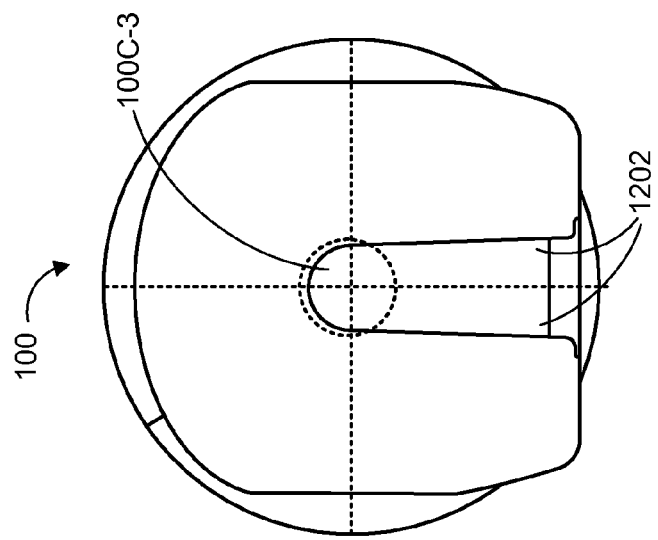
Figure 12A:
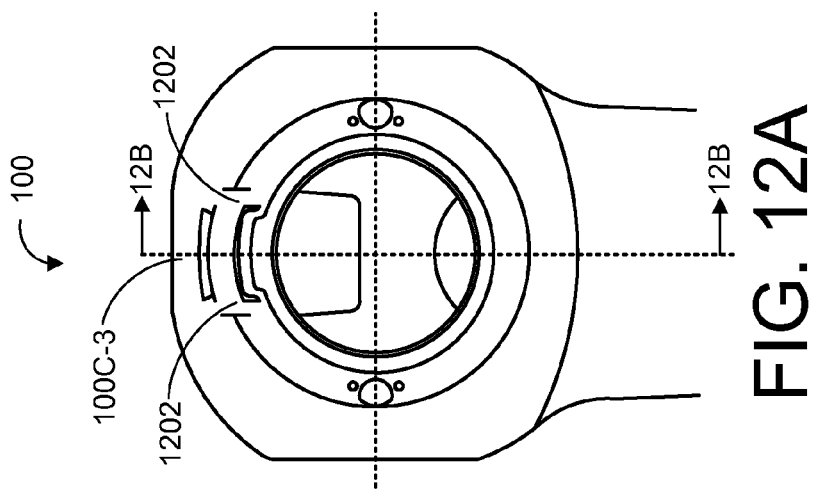

FIGS. 12A-12C show different views of the fire hydrant body 100, in accordance with one embodiment of the invention. FIG. 12A is a front view of the fire hydrant body 100, in accordance with one embodiment of the invention. FIG. 12B is a sectional view 12B-12B (see FIG. 12A) of the fire hydrant body 100, in accordance with one embodiment of the invention. FIG. 12C is a top view of the fire hydrant body 100, in accordance with one embodiment of the invention. The fire hydrant body 100 includes one or more valve access channel drain 1202. The valve access channel drain channel 1202 drains any water from the valve access channel 100C-3.

The valve access channel drain channel 1202 slopes slightly downward toward the cap body 106C of locking cap 106. The slope 1204 can be very slight such as about 2 degrees down from a horizontal 1206. If needed the degree of slope 1204 can be increased to achieve the desired drainage. The valve access channel drain channel 1202 can be straight or have a slight downward curvature.

In summary, the present invention provides a valve control device for fire hydrant that includes, among other features, an improved flow system through the valve control device and an improved standpipe drain system. The invention has been described herein in terms of several exemplary embodiments. Other embodiments of the invention will be apparent to those skilled in the art from consideration of the specification and practice of the invention. The embodiments and preferred features described above should be considered exemplary, with the invention being defined by the appended claims and equivalents thereof.

What is claimed is:

1. A valve control device comprising:
    an operating stem;
    a valve top plate having a conical base with at least three stabilizer arms extending therefrom, each of the at least three stabilizer arms having a flat outer surface wherein each of the at least three stabilizer arms has an inner edge opposite the outer surface, the inner edge having a concave curve having one or more radii; wherein the at least three stabilizer arms are disposed around the conical base so that centerlines of the stabilizer arms are spaced apart by between a range of 90 and 135 degrees;
    a valve seat rubber;
    a valve bottom plate securing the valve seat rubber between the valve bottom plate and a flat bottom surface of the valve top plate, the valve bottom plate, the valve seat rubber and the conical base being mounted on the operating stem; and
    a valve seat ring having a plurality of slots, each of the plurality of slots corresponding to one of the at least three stabilizer arms.

2. The valve control device of claim 1, further comprising an inlet elbow including:
    a bottom inner surface; and
    a contoured floor.

3. The valve control device of claim 1, wherein the operating stem includes an operating nut.

4. The valve control device of claim 3, wherein the operating nut is disposed in a fire hydrant.

5. The valve control device of claim 4, wherein the fire hydrant is a locking fire hydrant including a locking cap mounted on the fire hydrant, the locking cap being configured to close off a main outlet port and an access to the operating nut.

6. The valve control device of claim 1, wherein the conical base forms an angle of between 20 degrees and 60 degrees between the surface of the conical base and the flat bottom surface of the valve top plate.

7. The valve control device of claim 1, wherein each of the at least three stabilizer arms has a substantially triangular cross-sectional shape having an inner angle that is opposite the flat outer surface, the inner angle being between 20 degrees and 45 degrees, the flat outer surface having a corresponding width of between 20 degrees and 45 degrees.

8. The valve control device of claim 1, wherein the concave curve having a corresponding origin of each of the one or more radii disposed in an inward direction at least one of toward or beyond a centerline of the valve top plate.

9. The valve control device of claim 1, wherein the valve seat ring includes at least one drain hole, the at least one drain hole being in fluid communication with an outlet portion of the valve seat ring with the valve control device in a closed position, the at least one drain hole being covered by one of the at least three stabilizer arms when the valve control device is in an open position.

10. The valve control device of claim 1, wherein valve seat rubber is formed from at least one of an acetal resin (Delrin®) material and a polyethylene terephthalate (PET) material and a ultra high molecular weight (UHMW) polyethylene material.

11. The valve control device of claim 1, wherein the valve seat ring includes at least one drain hole, the at least one drain hole being in fluid communication with an inlet portion of the valve seat ring with the valve control device in a pressure drain position.

12. A standpipe drain system comprising:
a standpipe;
a valve control device including:
an operating stem;
a valve top plate having a conical base having at least three stabilizer arms, each of the at least three stabilizer arms having a flat outer surface wherein each of the at least three stabilizer arms has an inner edge opposite the outer surface, the inner edge having a concave curve having one or more radii, wherein the at least three stabilizer arms are disposed around the conical base so that centerlines of the stabilizer arms are spaced apart by between a range of 90 and 135 degrees;
a valve seat rubber;
a valve bottom plate securing the valve seat rubber between the valve bottom plate and a flat bottom surface of the valve top plate, the valve bottom plate, the valve seat rubber, and the conical base being mounted on the operating stem; and
a valve seat ring having a plurality of slots, each of the plurality of slots corresponding to one of the at least three stabilizer arms, wherein the valve seat ring includes at least one drain hole, the at least one drain hole being in fluid communication with an outlet portion of the valve seat ring with the valve control device in a closed position, the at least one drain hole being covered by one of the at least three stabilizer arms when the valve control device is an open position.

13. The standpipe drain system of claim 12, further comprising a drain ring including a plurality of drain nipples, each of the drain nipples having a drain port.

14. The standpipe drain system of claim 13, further comprising a saturation ring including a drain channel and a plurality of notches and a plurality of outlet notches, wherein a drain route is defined by the at least one drain port in the valve seat ring, the plurality of drain ports in the drain ring, and the plurality of notches and the plurality of outlet notches and the drain channel in the saturation ring, the drain route providing a fluid communication route between an outlet portion of the valve seat ring in the standpipe and an external portion of the standpipe.

15. The standpipe drain system of claim 13, further comprising a saturation ring disposed around a perimeter of the drain ring the saturation ring including a plurality of outlet notches and wherein each of the at least one drain hole in the valve seat is radially offset from each of the plurality of drain ports in the drain ring and wherein each of the plurality of drain ports are radially offset from each of the plurality of outlet notches in the saturation ring.

16. The standpipe drain system of claim 12, wherein the at least one drain hole being in fluid communication with an inlet portion of the valve seat ring with the valve control device in a pressure drain position.

17. A standpipe drain system comprising: a standpipe; and a valve control device including: an operating stem; a valve top plate having a conical base having at least three stabilizer arms, each of the at least three stabilizer arms having a flat outer surface; a valve seat robber; a valve bottom plate securing the valve seat rubber between the valve bottom plate and a flat bottom surface of the valve top plate, the valve bottom plate, the valve seat rubber, and the conical base being mounted on the operating stem; and a valve seat ring having a plurality of slots, each of the plurality of slots corresponding to one of the at least three stabilizer arms, wherein the valve seat ring includes at least one drain hole, the at least one drain hole being in fluid communication with an inlet portion of the valve seat ring with the valve control device in a pressure drain position wherein a saturation ring including a drain channel and a plurality of notches and a plurality of outlet notches, wherein a drain route is defined by the at least one drain hole in the valve seat ring, the plurality of drain ports in the drain ring, the plurality of notches and the plurality of outlet notches and the drain channel in the saturation ring, the drain route providing a fluid communication route between an outlet portion of the valve seat ring in the standpipe and an external portion of the standpipe, wherein each of the at least one drain hole in the valve seat is radially offset from each of the plurality of drain ports in the drain ring and wherein each of the plurality of drain ports are radially offset from each of the plurality of outlet notches in the saturation ring.

18. The standpipe drain system of claim 17, wherein the at least three stabilizer arms are disposed around the conical base so that centerlines of the stabilizer arms are spaced apart by between a range of 90 and 135 degrees.

* * * * *